US012225914B1

(12) United States Patent
Porter et al.

(10) Patent No.: US 12,225,914 B1
(45) Date of Patent: Feb. 18, 2025

(54) FREEZE DRYERS AND DRYING PROCESSES FOR MATERIALS WITH LOW WATER CONTENT

(71) Applicant: Harvest Right, LLC, Salt Lake City, UT (US)

(72) Inventors: Dale Porter, South Jordan, UT (US); Daniel D. Neville, Fruit Heights, UT (US)

(*) Notice: Subject to any disclaimer, the term of this patent is extended or adjusted under 35 U.S.C. 154(b) by 0 days.

(21) Appl. No.: 18/658,827

(22) Filed: May 8, 2024

Related U.S. Application Data

(60) Provisional application No. 63/500,879, filed on May 8, 2023.

(51) Int. Cl.
| F26B 5/06 | (2006.01) |
| A23G 7/00 | (2006.01) |
| A23G 7/02 | (2006.01) |

(52) U.S. Cl.
CPC .............. *A23G 7/02* (2013.01); *A23G 7/0093* (2013.01); *F26B 5/06* (2013.01)

(58) Field of Classification Search
CPC ............ F26B 5/06; A23G 7/02; A23G 7/0093
USPC ...................................................... 34/92, 287
See application file for complete search history.

(56) References Cited

U.S. PATENT DOCUMENTS

| 2,400,748 | A | 5/1946 | Flosdorf |
| 2,450,645 | A | 10/1948 | Doyle |
| 2,508,107 | A | 5/1950 | Flosdorf |
| 2,528,476 | A | 10/1950 | Roos et al. |
| 2,765,236 | A | 10/1956 | Blaine, Jr. |
| 2,785,075 | A | 3/1957 | Malecki |
| 3,078,586 | A * | 2/1963 | Rey ............................ A23L 3/44 34/92 |
| 3,169,070 | A | 2/1965 | Mehrlich |
| 3,218,725 | A | 11/1965 | Lamb |
| 3,219,461 | A | 11/1965 | Lamb |

(Continued)

FOREIGN PATENT DOCUMENTS

| CN | 105962005 A * | 9/2016 | ............... A23L 3/44 |
| CN | 107034183 | 8/2017 | |

(Continued)

OTHER PUBLICATIONS

30 Minute Freeze Dried Candy, Phil at 4800 feet YouTube channel, available at https://www.youtube.com/watch?v=ZDaOp7GnlcE, the video is submitted as one or more pdf files containing screenshots taken at approximately 1 sec intervals, Dec. 16, 2021 (each page labeled "30 Minute Freeze Dried Candy" and consecutively numbered) (total 464 pp.).

(Continued)

*Primary Examiner* — Stephen M Gravini
(74) *Attorney, Agent, or Firm* — FisherBroyles, LLP

(57) ABSTRACT

Various embodiments of freeze dryers and drying processes are disclosed that can be used to dry materials with low water content (no more than 20 wt % water) and/or high sugar content (at least 20 wt % sugar). Such materials include candy, confections, and the like. In one embodiment, a drying process includes drying the materials without freezing them. In another embodiment, a drying process includes warming the materials before drying them. In another embodiment, a drying process includes drying two batches of materials with low water content sequentially without defrosting the interior of freeze dryer.

30 Claims, 16 Drawing Sheets

(56) References Cited

U.S. PATENT DOCUMENTS

| | | | |
|---|---|---|---|
| 3,219,463 A | | 11/1965 | Lamb |
| 3,233,333 A | | 2/1966 | Oppenheimer |
| 3,271,874 A | | 9/1966 | Oppenheimer |
| 3,279,199 A | | 10/1966 | Kapeker |
| 3,396,041 A | | 8/1968 | Laskin |
| 3,419,402 A | | 12/1968 | Laskin |
| 3,871,107 A | | 3/1975 | Broadwin |
| 4,197,658 A | | 4/1980 | Fraser |
| 4,520,574 A | | 6/1985 | Sugisawa et al. |
| 4,521,975 A | * | 6/1985 | Bailey ............... F26B 5/06 422/942 |
| 4,543,734 A | | 10/1985 | Smith |
| 4,561,191 A | | 12/1985 | Parkinson |
| 4,612,200 A | | 9/1986 | Sato |
| 4,780,964 A | | 11/1988 | Thompson, Sr. |
| 4,823,478 A | | 4/1989 | Thompson, Sr. |
| 4,978,467 A | | 12/1990 | Shankland et al. |
| 5,020,237 A | * | 6/1991 | Gross ............... A23L 3/40 34/267 |
| 5,398,426 A | | 3/1995 | Connor |
| 5,727,333 A | | 3/1998 | Folan |
| 5,822,882 A | * | 10/1998 | Anger ............... F26B 5/06 34/92 |
| 6,122,836 A | | 9/2000 | Tenedini et al. |
| 6,226,887 B1 | | 5/2001 | Tenedini et al. |
| 6,327,866 B1 | | 12/2001 | Novak et al. |
| 6,481,223 B2 | | 11/2002 | Flynn et al. |
| 6,564,471 B1 | * | 5/2003 | Sutherland ............... F26B 5/06 34/92 |
| 6,669,689 B2 | | 12/2003 | Lehmann et al. |
| 6,684,524 B1 | | 2/2004 | Sennhenn et al. |
| 6,971,187 B1 | * | 12/2005 | Pikal ............... F26B 5/06 34/92 |
| 9,459,044 B1 | * | 10/2016 | Haddock ............... F26B 3/00 |
| 9,521,856 B2 | | 12/2016 | Kang et al. |
| 10,809,003 B2 | * | 10/2020 | De Beer ............... F26B 5/06 |
| 11,287,185 B1 | * | 3/2022 | Jiang ............... F26B 5/06 |
| 11,634,257 B2 | * | 4/2023 | Weimer ............... A61J 1/10 34/92 |
| 11,732,965 B2 | * | 8/2023 | Yoshimoto ............... F26B 5/06 34/312 |
| 11,744,257 B1 | * | 9/2023 | Haddock ............... F26B 5/06 426/384 |
| 2004/0060191 A1 | | 4/2004 | Sennhenn et al. |
| 2005/0086950 A1 | | 4/2005 | Khatri |
| 2005/0144804 A1 | | 7/2005 | Alstat |
| 2007/0186437 A1 | | 8/2007 | Gasteyer et al. |
| 2010/0018073 A1 | | 1/2010 | Fissore et al. |
| 2013/0239430 A1 | | 9/2013 | Ito et al. |
| 2013/0316054 A1 | | 11/2013 | Wolfram |
| 2014/0069607 A1 | | 3/2014 | Crook |
| 2014/0087057 A1 | | 3/2014 | Kang et al. |
| 2014/0202025 A1 | | 7/2014 | Ling |
| 2021/0190425 A1 | | 6/2021 | Ganguly et al. |
| 2022/0125078 A1 | | 4/2022 | Porter et al. |
| 2023/0122361 A1 | | 4/2023 | MacKay et al. |
| 2024/0230225 A1 | | 7/2024 | MacKay et al. |

FOREIGN PATENT DOCUMENTS

| | | | | |
|---|---|---|---|---|
| EP | 3462116 A1 | * | 4/2019 | ............. F26B 21/10 |
| FR | 2911672 A1 | * | 7/2008 | ............... F26B 5/06 |
| JP | 2012231778 | | 11/2012 | |
| JP | 2012231780 | | 11/2012 | |
| JP | 2017212890 | | 12/2017 | |
| WO | WO-2021081444 A1 | * | 4/2021 | ........... A23L 33/105 |

OTHER PUBLICATIONS

Freeze Dried Skittles in Eight Minutes, Phil at 4800 feet YouTube channel, available at https://www.youtube.com/watch?v=tmsVW8pIM80, the video is submitted as one or more pdf files containing screenshots taken at approximately 1 sec intervals, Dec. 12, 2021 (each page labeled "Freeze Dried Skittles in Eight Minutes" and consecutively numbered) (total 187 pp.).

Guide to Freeze Drying, Harvest Right, LLC, Sep. 27, 2019 (6 pp.).

HarvestRight Version 5X19 Instructions, A Better Freeze Drying Group for the Harvest Right Freeze Dryer and Others, Facebook, Jun. 22, 2022 (8 pp.).

Home Freeze Dryer Owner's Manual, Harvest Right, LLC, Apr. 2022 (32 pp.).

How to Freeze Dry Skittles in 6 Hours, Or so she says, Aug. 16, 2020 (4 pp.).

How to Make Freeze Dried Candy (ebook), Freeze Dried Goodies, webpage date: Nov. 16, 2023; emails on webpage and/or included with reference: May 25, 2022 to Jun. 23, 2022 (14 pp.).

How to Make Freeze Dried Candy, Freeze Dried Goodes, 2023 copyright date, Jul. 28, 2023 pdf creation date (42 pp.).

How to Use the Candy Application, Harvest Right, LLC, PDF file creation date Aug. 2, 2022 (2 pp.).

The Cube, Freeze Dryer Owner's Manual, Prep4Life, pdf created on Mar. 2, 2023 (23 pp.).

The Cube Freeze Dryer—Using Candy Express Mode, Pete B: East Texas Homesteading Rumble channel, available at https://rumble.com/v2fcg9d-the-cube-freeze-dryer-using-candy-express-mode.html, the video is submitted as one or more pdf files containing screen shots taken at approximately 1 sec intervals (captions provided by Windows Live Caption), Mar. 29, 2023 (each page labeled "TCRV" and consecutively numbered) (total 425 pp.).

U.S. Appl. No. 18/658,827, filed May 8, 2024, Freeze Dryers and Drying Processes for Materials with Low Water Content.

U.S. Appl. No. 18/942,945, filed Nov. 11, 2024, Freeze Dryers and Drying Processes for Materials with Low Water Content.

U.S. Appl. No. 18/951,613, filed Nov. 18, 2024, Freeze Dryers and Drying Processes for Materials with Low Water Content.

* cited by examiner

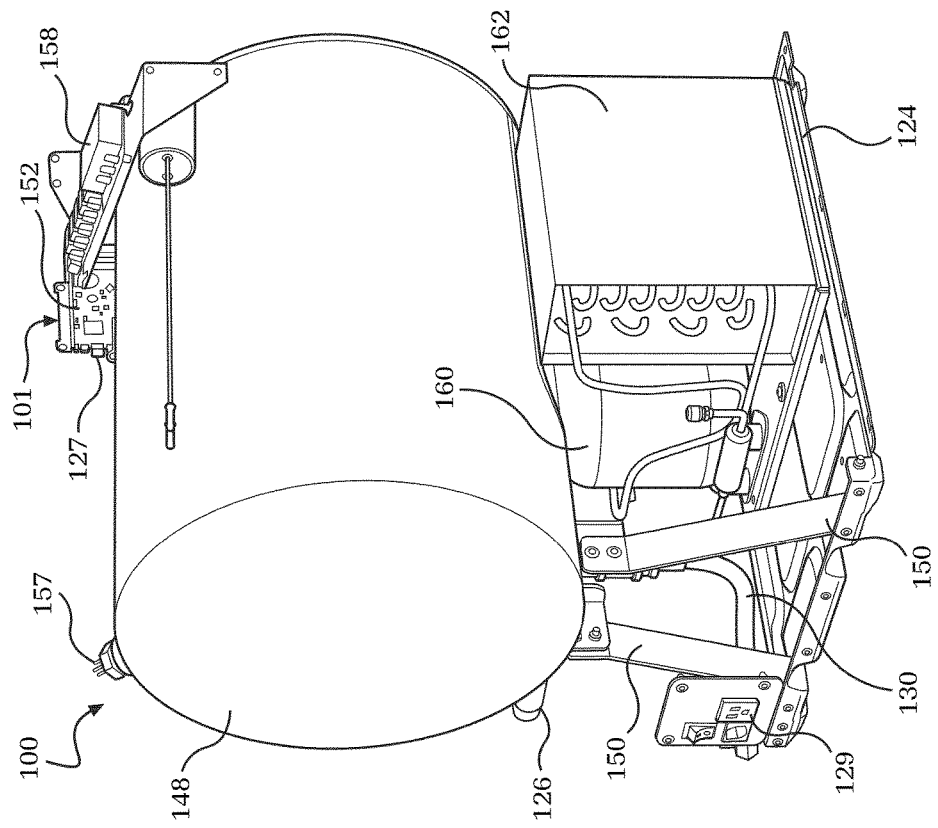
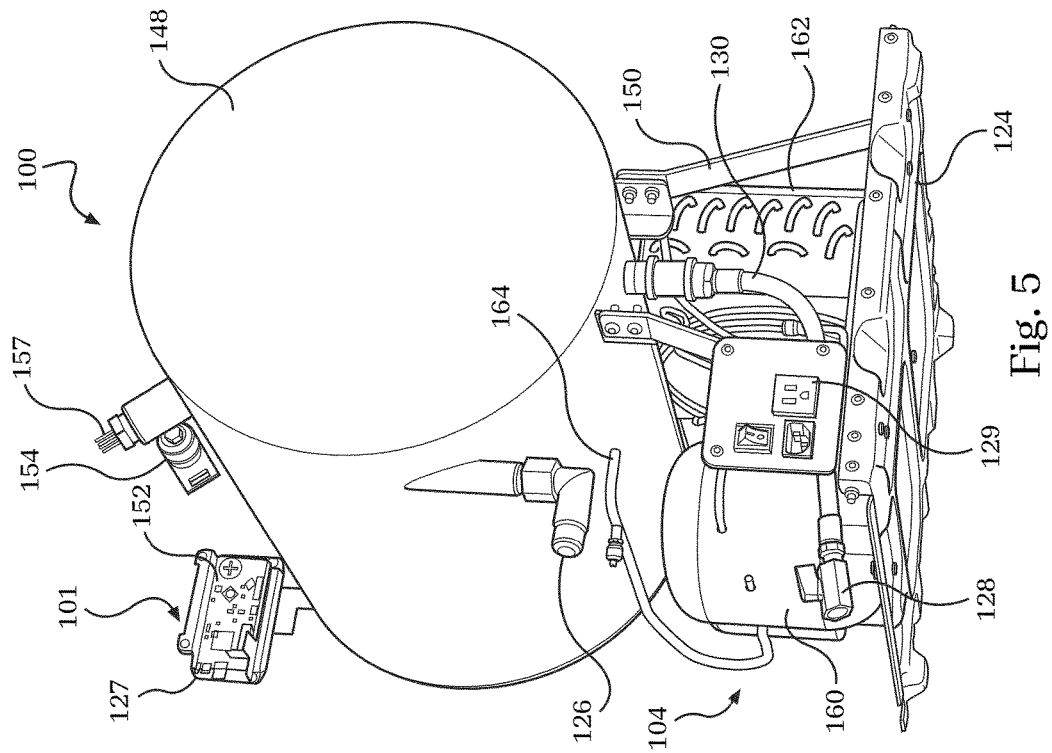

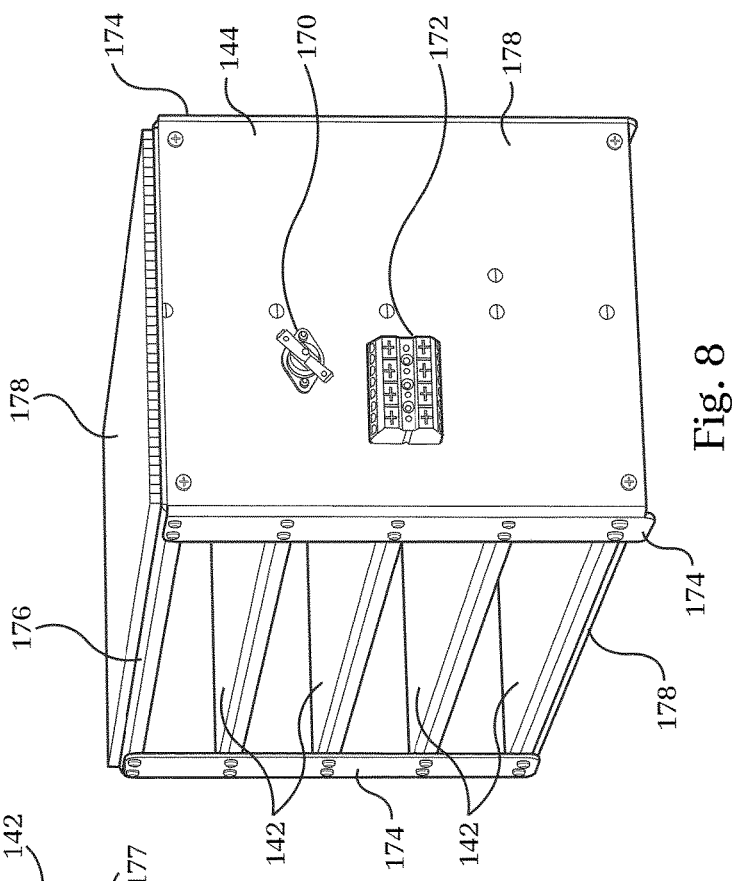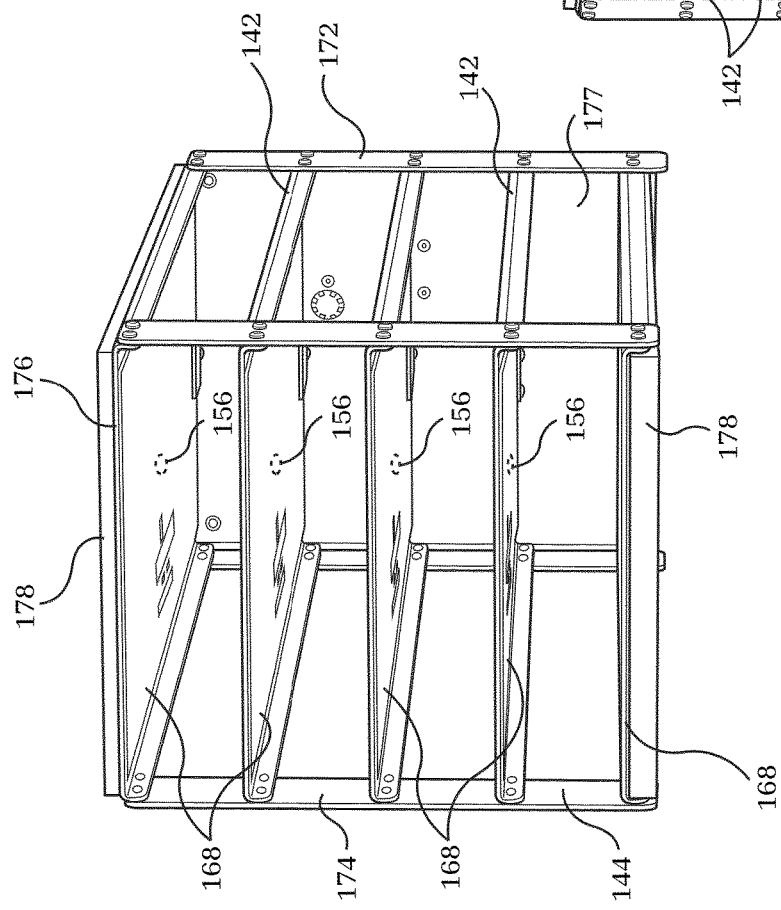

FREEZE DRYERS AND DRYING PROCESSES FOR MATERIALS WITH LOW WATER CONTENT

TECHNICAL FIELD

This relates to freeze dryers and drying processes used to dry materials with low water content such as candy.

BACKGROUND

Freeze-drying, also known as lyophilization or cryodesiccation, is a process that removes water from a material using very low temperatures and a vacuum. The material is frozen and placed in a vacuum and the pressure is reduced to a level that allows the water in the material to sublimate or turn directly from a solid to a gas while skipping the liquid state. This process removes water from the material without damaging it, which makes freeze-drying useful for preserving perishable materials like food and biological samples. Freeze dried materials are lightweight and easy to store, and they can be reconstituted by adding water.

GENERAL DESCRIPTION

This document describes freeze dryers and drying methods that are especially suitable for drying materials with low water content and/or high sugar content. Materials with low water content are those having no more than 20 wt % water. Materials with high sugar content are those having at least 20 wt % sugar. Examples of such materials include candy, confections, sweets, and the like.

In some embodiments, a method for drying materials with low water content includes drying the materials in a freeze dryer without freezing them. In these embodiments, the freeze dryer is capable of operating as both a freeze dryer where the material is frozen and dried at a vacuum pressure and a dryer where the material is not frozen but still dried at a vacuum pressure. The low water content in the material allows drying it at a vacuum pressure.

In some embodiments, a method for drying materials with low water content includes warming the materials in the freeze dryer before drying them at reduced pressure. For example, the materials can be loaded into the freeze dryer and heated before the pressure is reduce to a vacuum pressure.

In some embodiments, a method for drying materials with low water content includes drying two or more batches in succession without defrosting the interior of the freeze dryer. Skipping the defrosting step makes it much faster to dry large quantities of low water content material.

In some embodiments, freeze dryers include an electronic controller programmed to dry the low water content materials in any of the ways described in this document. This includes any of the ways described above.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; and memory communicatively linked to the processor, the memory storing instructions used by the processor to operate the freeze dryer; wherein the instructions include a drying process including drying the material by reducing the pressure in the vacuum chamber below ambient pressure without freezing the material before reducing the pressure.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; memory communicatively linked to the processor; and a display device communicatively linked to the processor; wherein the electronic controller is configured to: display an option on the display device to operate the freeze dryer without freezing the material before reducing the pressure in the vacuum chamber; receive input selecting the option to operate the freeze dryer without freezing the material before reducing the pressure in the vacuum chamber; and dry the material by reducing the pressure in the vacuum chamber below ambient pressure without freezing the material before reducing the pressure.

In some embodiments, the freeze dryer includes: a vacuum chamber including one or more interior walls; a vacuum pump pneumatically linked to the vacuum chamber; a cooling system configured to cool the one or more interior walls of the vacuum chamber; a heating system configured to heat the material in the vacuum chamber; and an electronic controller including: a processor; and memory communicatively linked to the processor; and a method for drying material in the freeze dryer includes: positioning the material in the freeze dryer; and drying the material by reducing the pressure in the vacuum chamber below ambient pressure without freezing the material before reducing the pressure.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; and memory communicatively linked to the processor, the memory storing instructions used by the processor to operate the freeze dryer; wherein the instructions include a drying process including drying the material by reducing the pressure in the vacuum chamber below ambient pressure and heating the material before reducing the pressure.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; memory communicatively linked to the processor; and a display device communicatively linked to the processor; wherein the electronic controller is configured to: display an option on the display device to heat the material before drying the material by reducing the pressure in the vacuum chamber below ambient pressure; receive input selecting the option to heat the material before drying the material by reducing the pressure in the vacuum chamber below ambient pressure; and heat the material and subsequently dry the material by reducing the pressure in the vacuum chamber below ambient pressure.

In some embodiments, the freeze dryer includes: a vacuum chamber including one or more interior walls; a vacuum pump pneumatically linked to the vacuum chamber; a cooling system configured to cool the one or more interior walls of the vacuum chamber; a heating system configured to heat the material in the vacuum chamber; and an electronic controller including: a processor; and memory communicatively linked to the processor; a method for drying material in the freeze dryer includes: positioning the material in the freeze dryer; heating the material in the freeze dryer before reducing the pressure in the vacuum chamber below ambient pressure; and drying the material by reducing the pressure in the vacuum chamber below ambient pressure.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; and memory communicatively linked to the processor, the memory storing instructions used by the processor to operate the freeze dryer; wherein the instructions include a drying process including drying the material by reducing the pressure in the vacuum chamber below ambient pressure and collecting water vapor from the material as ice on the one or more interior walls of the vacuum chamber; and wherein the instructions include an option to repeat the drying process with another material without defrosting the ice on the one or more interior walls of the vacuum chamber.

In some embodiments, a freeze dryer includes: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller including: a processor; memory communicatively linked to the processor; and a display device communicatively linked to the processor; wherein the electronic controller is configured to: dry the material by reducing the pressure in the vacuum chamber below ambient pressure, wherein water vapor removed from the material collects as ice on the one or more interior walls of the vacuum chamber; display an option on the display device to repeat the drying process with another material without defrosting the ice on the one or more interior walls of the vacuum chamber.

In some embodiments, the freeze dryer includes: a vacuum chamber including one or more interior walls; a vacuum pump pneumatically linked to the vacuum chamber; a cooling system configured to cool the one or more interior walls of the vacuum chamber; a heating system configured to heat a first material and a second material in the vacuum chamber; and an electronic controller including: a processor; and memory communicatively linked to the processor; a method for drying the first material and the second material in the freeze dryer includes: positioning the first material in the freeze dryer; drying the first material by reducing the pressure in the vacuum chamber below ambient pressure; collecting water vapor from the first material as ice on the one or more interior walls of the vacuum chamber; removing the first material in the freeze dryer; positioning the second material in the freeze dryer; drying the second material in the freeze dryer by reducing the pressure in the vacuum chamber below ambient pressure without defrosting the ice on the one or more interior walls of the vacuum chamber.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which:

FIGS. 5-6 are rear perspective views of the freeze dryer in FIG. 2 with the housing removed.

FIGS. 7-8 are front and rear perspective views, respectively, of one embodiment of a shelf support structure that can be used with the freeze dryer in FIG. 2.

DETAILED DESCRIPTION OF EMBODIMENTS

Freeze Dryer

Figure 1:
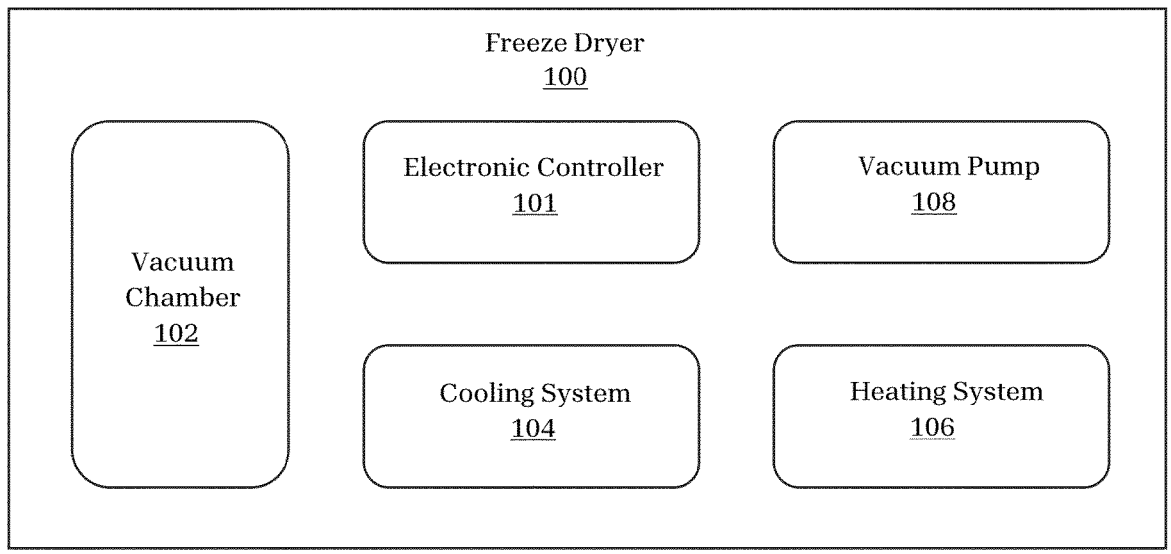
FIG. 1 is a conceptual diagram of one embodiment of a freeze dryer.

FIG. 1 is a conceptual diagram of one embodiment of a freeze dryer 100 (alternatively referred to as a freeze-drying system). The freeze dryer 100 includes an electronic controller 101, a vacuum chamber 102 (alternatively referred to as a cooling chamber), a cooling system 104 (alternatively referred to as a refrigeration system), a heating system 106, and a vacuum pump 108.

Vacuum Chamber

The vacuum chamber 102 is structured to receive the material to be freeze dried. In some embodiments, the vacuum chamber 102 includes one or more shelves structured to receive one or more trays of material to be freeze dried. The vacuum chamber 102 is constructed to withstand the vacuum pressure of the freeze-drying process. In other words, the vacuum chamber 102 is constructed to withstand ambient atmospheric pressure when all or at least substantially all the air in the vacuum chamber 102 is removed.

It should be appreciated that the vacuum chamber 102 can be any suitable size and shape and can be made of any suitable material. In some embodiments, the vacuum chamber 102 has a cylindrical shape, which can withstand the vacuum pressures associated with freeze-drying. In other embodiments, the vacuum chamber 102 can have other shapes such as a cubic shape, a rectangular shape, a spherical shape, or the like. The vacuum chamber 102 is preferably constructed of a sturdy metal material such as stainless steel or other type of steel. However, it is conceivable, although less preferred, for the vacuum chamber 102 to be constructed of materials such as plastics and/or composites.

Cooling System

The cooling system 104 is used to cool the interior of the vacuum chamber 102 during the freeze-drying process. The cooling system 104 can be any suitable cooling system capable of producing the desired amount of cooling. In some embodiments, the cooling system 104 relies on the vapor-compression cycle of a fluid to transfer heat away from the vacuum chamber 102. The cooling system 104 can include an evaporator, condenser, and compressor. The evaporator is positioned adjacent to the vacuum chamber 102 to absorb heat from the vacuum chamber 102 thereby cooling the vacuum chamber 102. The absorbed heat is transferred from the evaporator to the condenser, which is positioned away from the vacuum chamber 102, and released.

It should be appreciated that the cooling system 104 can have any suitable size and/or configuration. In some embodiments, the cooling system 104 is configured to cool the vacuum chamber 102 (including the interior wall surfaces of the vacuum chamber 102) to a temperature below the temperature of the material being freeze dried. In some embodiments, the cooling system 104 is configured to cool the vacuum chamber 102 to any temperature from 0° F. or below to −60° F. or below. For example, the cooling system 104 can be configured to cool the vacuum chamber 102 to −25° F. or below, −30° F. or below, −35° F. or below, −40° F. or below, −45° F. or below, −50° F. or below, −55° F. or below, or −60° F. or below.

In some embodiments, the interior walls or surfaces of the vacuum chamber 102 can be used to collect water vapor produced during the freeze-drying process. In this way, the vacuum chamber 102 also functions as a cold trap or collector for water vapor removed from the frozen material. The interior walls of the vacuum chamber 102 can be cooled by the cooling system 104 to a temperature sufficient to cause the water vapor to condense and/or desublimate when it contacts the walls. For example, in some embodiments, the interior walls can be cooled to a temperature of −20° F. to −100° F.

In other embodiments, the freeze dryer 100 can include a collector (or collecting system) that is separate from the vacuum chamber 102. In these embodiments, the interior walls of the vacuum chamber 102 are cooled less to allow the water vapor to flow out of the vacuum chamber 102 to the separate collector.

Heating System

The heating system 106 is configured to heat the material being freeze dried during the drying phase of the process. The heating system 106 can include various heating elements positioned underneath and/or above the material being freeze dried. In some embodiments, the heating system 106 is configured to heat the material being freeze dried by way of conduction and/or radiation. For example, the heating system 106 can include heating elements positioned on the top or the bottom of the shelves in the vacuum chamber 102 and/or underneath the trays holding the material. It can also include heating elements positioned on the shelves directly above the trays that radiate heat onto the material.

It is generally desirable to configure the vacuum chamber 102 and the heating system 106 so that only the material being freeze dried is heated and not the rest of the vacuum chamber 102. This is especially the case when the interior wall surfaces of the vacuum chamber 102 are cooled and used to collect the water vapor (through condensation and/or desublimation) produced during the drying process.

In some embodiments, the heating system 106 is an electric heating system. Heat is produced by passing electricity through resistive elements that respond by becoming hot. Such a heating system provides responsive, granular control over the heating of the material in the vacuum chamber 102. In some embodiments, the heating elements include silicone heating pads positioned under the shelves and/or trays.

It should be appreciated, however, that the heating system 106 can use any suitable method for providing heat including those that do not rely on electricity. For example, the heating system 106 can operate by heating a fluid such as silicon oil that is passed through a heat exchanger that is part of or coupled to the shelves.

Vacuum Pump

The vacuum pump 108 is pneumatically linked to the vacuum chamber 102 and used to reduce the pressure in the vacuum chamber 102 as part of the freeze-drying process. When turned on, the vacuum pump 108 can produce a vacuum or near vacuum in the vacuum chamber 102. Any suitable type or size of vacuum pump can be used so long as it can reduce the pressure in the vacuum chamber 102 sufficiently to freeze dry the material. In some embodiments, the vacuum pump 108 is an oil free vacuum pump available from Harvest Right, LLC.

In some embodiments, the vacuum pump 108 can reduce the pressure in the vacuum chamber 102 to a range of 2000 mTorr or below to 50 mTorr or below. For example, the vacuum pump 108 can reduce the pressure in the vacuum chamber 102 to 2000 mTorr or below, to 1500 mTorr or below, to 1250 mTorr or below, to 1000 mTorr or below, to 900 mTorr or below, to 800 mTorr or below, to 700 mTorr or below, to 600 mTorr or below, to 500 mTorr or below, to 400 mTorr or below, to 300 mTorr or below, to 200 mTorr or below, or to 150 mTorr or below.

Electronic Controller

The electronic controller 101 includes a processor 103, memory 105, a storage device 109, a display device 113, one or more input devices 117, one or more output devices 121, one or more communication devices 125, and a power supply or source 129. Additional details regarding the configuration of the electronic controller 101 are described below in the section dedicated to describing the electronic controller 101.

The electronic controller 101 is used to control the operation of the freeze dryer 100. It is communicatively linked to and configured to control the operation of the cooling system 104, the heating system 106, and the vacuum pump 108 during the various phases of the freeze-drying process.

The electronic controller 101 can turn the various systems or components on and off during the freeze-drying process. For example, the electronic controller 101 can operate the cooling system 104 and/or the vacuum pump 108 to freeze the material. After the material is sufficiently frozen, the electronic controller 101 can operate the heating system 106 along with the cooling system 104 and the vacuum pump 108 to dry the material through sublimation. The freeze-drying methods described below can be implemented using the electronic controller 101.

The display device 113 is used to receive input from the user regarding the desired configuration of the freeze dryer 100. The display device 113 can also output information related to the freeze dryer 100 and/or freeze-drying process to the user. For example, the display device 113 can display the status of the freeze-drying process—e.g., freezing, drying, process complete, and the like. Also, the user may be given the option to continue the freeze-drying process for an additional amount of time.

The same information that is available on the display device 113 can also be displayed on a mobile device communicatively linked to the electronic controller 101. For example, a mobile phone can run an app that communicates with the electronic controller 101 of the freeze dryer 100. In this way, the mobile device can be used to in any of the ways the display device 113 can be used—e.g., to receive input from users, display output to users, and the like.

The electronic controller 101 can include various sensors 139 that provide information about the status of the material being freeze dried and the components of the freeze dryer 100. In some embodiments, the electronic controller 101 includes temperature sensors positioned in the vacuum chamber 102 to measure the temperature of any one or more of the following: the shelves, the trays, the material being freeze dried, the interior surface(s) of the vacuum chamber 102, or the like. For example, temperatures sensors can be positioned on the top and/or bottom surfaces of the shelves to measure the temperature of the shelves, the trays, and/or the material on the trays.

In some embodiments, the electronic controller 101 includes pressure sensors positioned in or around the vacuum chamber 102 to measure the pressure inside the vacuum chamber 102. The electronic controller 101 uses the pressure information obtained from the pressure sensors to control the operation of the cooling system 104, the heating system 106, and/or the vacuum pump 108. For example, the electronic controller 101 can use pressure information to control the process in the manner described in the incorporated documents (see Incorporation by Reference section below).

In some embodiments, the freeze dryer 100 can have any of the configurations described in the incorporated documents. For example, the freeze dryer 100 can be implemented in the form of the freeze dryer 700 described in the '044 patent. It should be appreciated that the freeze dryer 100 can include any one or more of the subsystems and/or components described here or in the incorporated documents.

It should be appreciated that the freeze dryer 100 can have a variety of suitable configurations and be modified in a number of ways beyond what is described here. For example, in some embodiments, all the components—i.e., the electronic controller 101, the vacuum chamber 102, the cooling system 104, the heating system 106, and the vacuum pump 108 can be positioned inside a single housing. In other embodiments, one or more of the components can be positioned outside the housing that holds the other components. For example, the vacuum pump 108 can be positioned outside the housing while the other components are positioned inside the housing.

Freeze Dryer-One Embodiment

Figure 2:
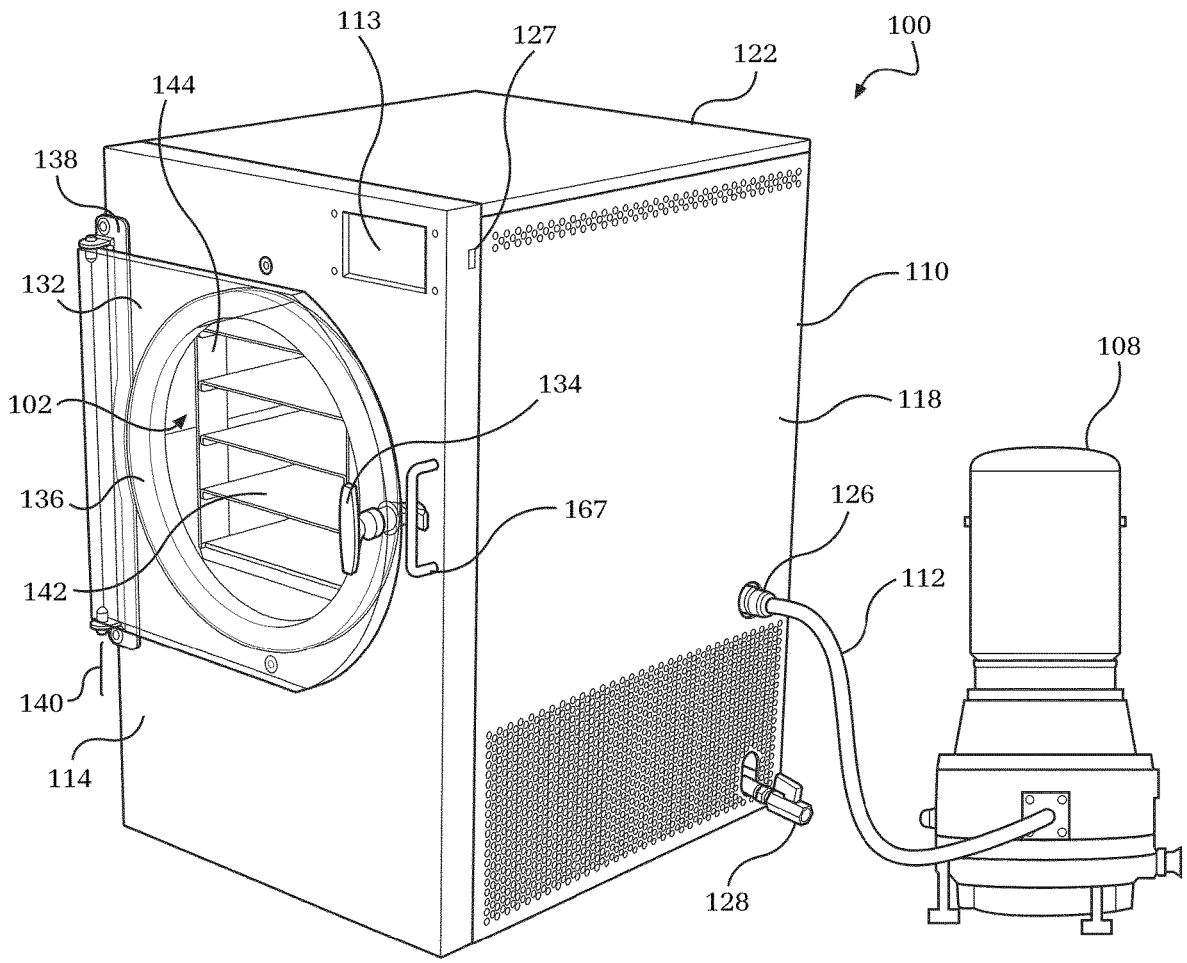
FIG. 2 is a front perspective view of one embodiment of a freeze dryer.
Figure 3:
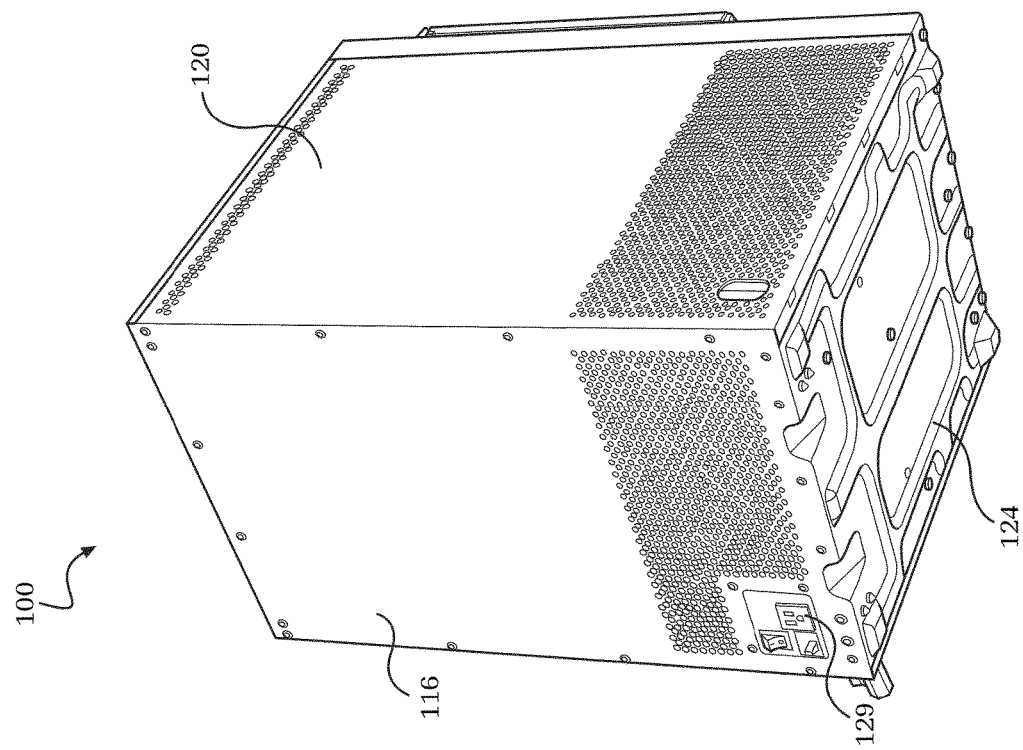
FIG. 3 is a back perspective view of the freeze dryer in FIG. 2.
Figure 9:
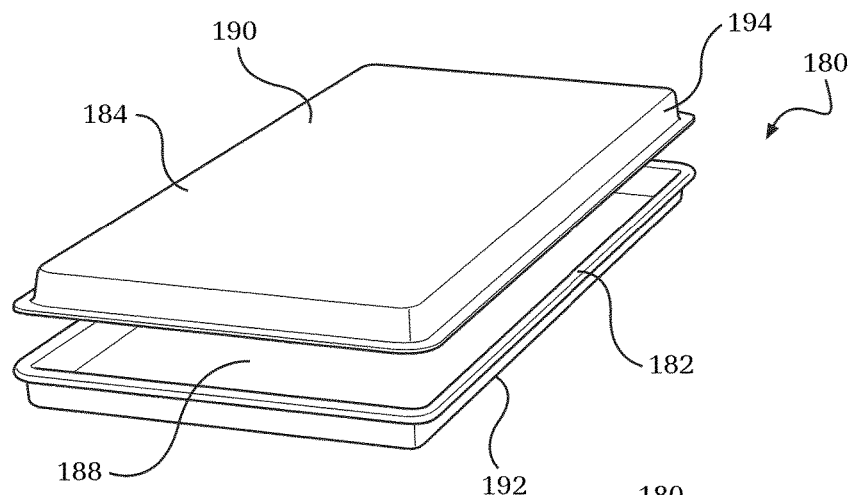
FIG. 9 is a perspective view of one embodiment of a tray for a freeze dryer including a lid and a base. The lid and base are shown spaced apart relative to each other.
Figure 10:
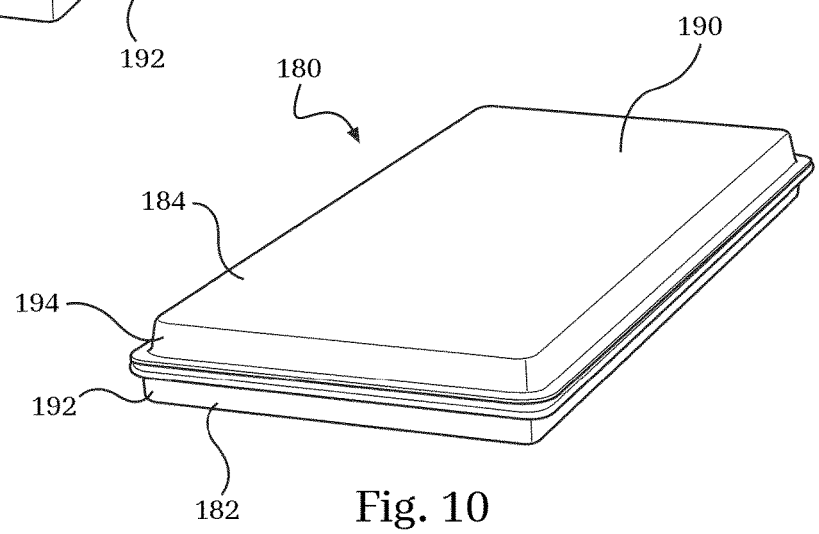
FIG. 10 is a perspective view of the tray in FIG. 9 with the lid placed on top of the base.
Figure 11:
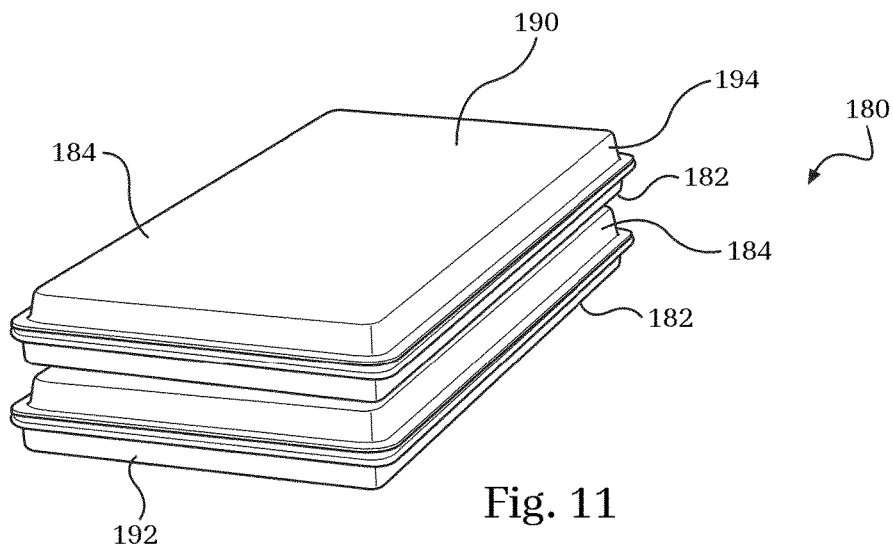
FIG. 11 is a perspective view of two trays in FIG. 9 stacked on top of each other.
Figure 12:
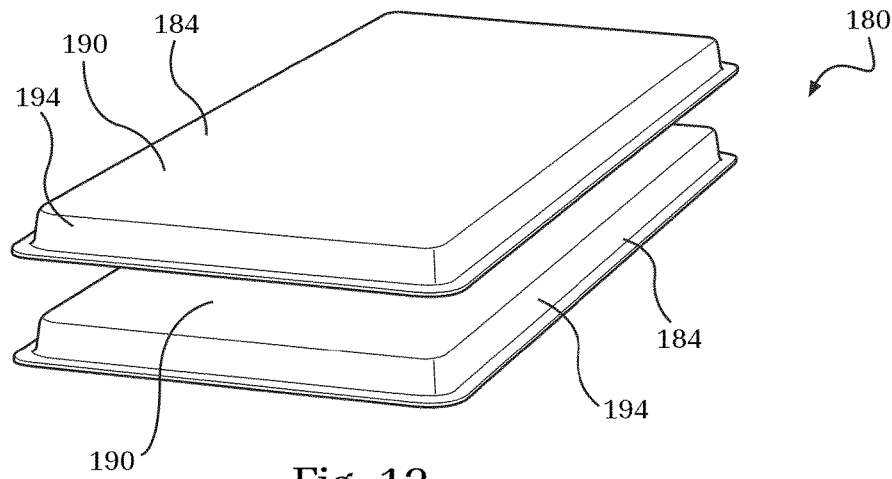
FIG. 12 is a perspective view of two lids from the tray in FIG. 9 with the lids shown spaced apart relative to each other.
Figure 13:
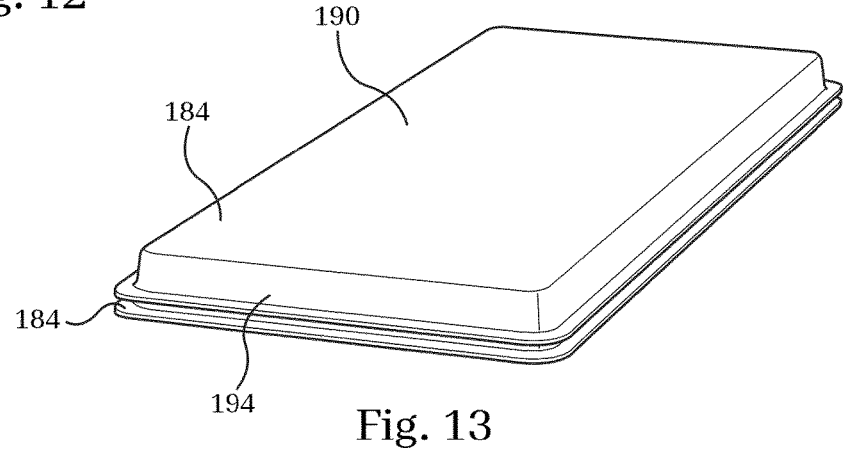
FIG. 13 is a perspective view of the lids in FIG. 12 nested together.

FIGS. 2-3 show front and back perspective views, respectively, of one embodiment of the freeze dryer 100 including a housing 110 (alternatively referred to as a cabinet). The housing 110 includes a front 114 (alternatively referred to as a front side or front wall), a back 116 (alternatively referred to as a back side or back wall) positioned opposite the front 114, a first side 118 (alternatively referred to as a first side wall), a second side 120 (alternatively referred to as a second side wall) positioned opposite the first side 118, a top 122 (alternatively referred to as a top side or top wall), and a bottom 124 positioned opposite the top 122 (alternatively referred to as a bottom side or bottom wall).

The front 114 of the housing 110 includes a door 132 through which material can be placed in and/or removed from the vacuum chamber 102. The door 132 is coupled to the front 114 of the housing 110 with a hinge 138 that defines a pivot axis 140. The hinge 138 is positioned laterally to one side of an opening to the vacuum chamber 102. The door 132 rotates about the axis 140 between an open position where the interior of the vacuum chamber 102 is open and accessible and a closed position where the interior of the vacuum chamber 102 is closed and inaccessible.

The door 132 includes a latch 134 (alternatively referred to as a handle) positioned on an opposite side of the door 132 relative to the hinge 138. The latch 134 is also positioned on an opposite side of the opening to the vacuum chamber 102 relative to the hinge 138. The latch 134 engages a catch device 167 located on the front 114 of the housing 110 to hold the door 132 in the closed position. In the closed position, the interior surface of the door 132 is pressed firmly against a gasket 136 (alternatively referred to as a seal) positioned around the opening to the vacuum chamber 102 to prevent air from entering the vacuum chamber 102 during the freeze-drying process.

In some embodiments, insulation can be positioned between the interior surface of the door 132 and the interior of the vacuum chamber 102. For example, a removable, circular disc of insulation enclosed in a fabric material can be positioned between the door 132 and the shelf support structure 144 to prevent heat transfer between the ambient environment and the interior of the vacuum chamber 102. It should be appreciated that the insulation can have a variety of other configurations including, for examples, a rigid foam disc, etc.

The door 132 can be made of any suitable material capable of withstanding the vacuum pressure in the vacuum chamber 102. For example, the door 132 can be made of plastic, metal, composites, or the like. In some embodiments, the door 132 is made of a strong, transparent, plastic material such as a polycarbonate material. The shape of the door 132 combined with the overall shape of the housing 110 provides an appealing aesthetic appearance to the freeze dryer 100.

It should be appreciated that the door 132 can be modified in many ways relative to the configuration shown in FIGS. 2-3. For example, the door 132 can be made of a material that is partially or completely opaque. The door 132 can also be shaped differently or mounted to the housing 110 in a different manner so long as it can cover the opening to the vacuum chamber 102 during the freeze-drying process.

The housing 110 encloses the electronic controller 101, the vacuum chamber 102, the cooling system 104, and the heating system 106. The housing 110 provides a way to keep the various systems and components organized in an aesthetically pleasing package. The housing 110 can be made of any suitable material including metal, plastic, composites, and the like.

The front 114 of the housing 110 includes an opening through which the display device 113 of the electronic controller 101 is visible. The display device 113 is used to output information to the user and/or receive input from the user. For example, in some embodiments, the display device 113 is a touch screen display device. The user can use the display device 113 to change the operation parameters and/or preferences associated with the freeze dryer 100.

The first side 118 of the housing 110 includes a wired communication interface 127 in the form of a USB port. It can be used to receive a USB storage device 109 containing, for example, software and/or firmware updates for the electronic controller 101.

The vacuum pump 108 is positioned outside of the housing 110 and pneumatically linked to the vacuum chamber 102 by way of a vacuum hose 112 (alternatively referred to as a hose, vacuum tube, or tube) coupled to a vacuum port 126 extending through the first side 118 of the housing 110. It should be appreciated that the vacuum hose 112 can be any suitable length and/or diameter. For example, the vacuum hose 112 can be 2-4 feet long and ¼ inch to ¾ inch in diameter. The vacuum hose 112 can also include a metal reinforcing structure to prevent the vacuum hose 112 from collapsing under vacuum conditions.

Figure 4:
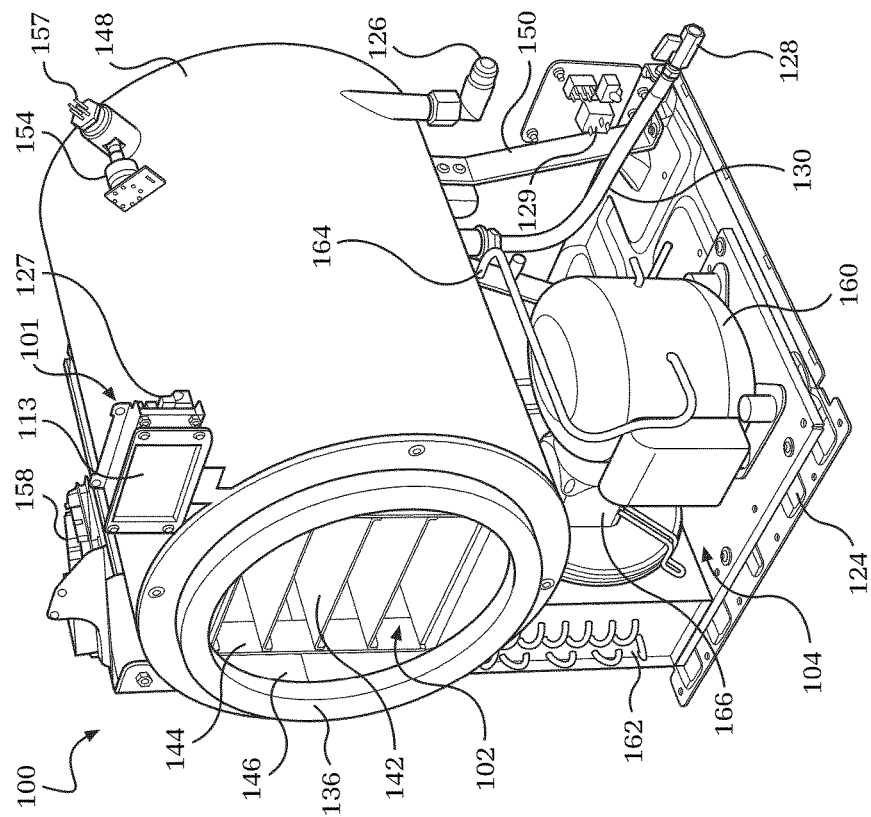
FIG. 4 is a front perspective view of the freeze dryer in FIG. 2 with the housing removed.

The freeze dryer 100 also includes a drain port 128 extending through the first side 118 of the housing 110 near the bottom 124. The drain port 128 is fluidly linked to the vacuum chamber 102 by a drain hose 130 as shown in FIG. 4. The drain port 128 can be opened and closed with a drain valve.

The drain port 128 can be used to drain the vacuum chamber 102 upon completion of the freeze-drying process. Water collects as ice or frost on the interior surface of the vacuum chamber 102 during the freeze-drying process and later melts when the process is complete and the vacuum chamber 102 returns to ambient temperature. The water exits the vacuum chamber 102 and the freeze dryer 100 through the drain hose 130 and the drain port 128.

The drain valve used to open and close the drain port 128 can be manually operated or can be controlled by the electronic controller 101. For example, in some embodiments, the user is prompted on the display device 113 to manually open or close the drain valve during the freeze-drying process. In other embodiments, the electronic controller 101 automatically opens and closes the drain valve as part of the freeze-drying process.

The vacuum chamber 102 receives and holds material during the freeze-drying process. In some embodiments, the vacuum chamber 102 includes one or more shelves 142 positioned to receive trays 180 (FIGS. 9-14) holding the material. It should be appreciated that the shelves 142 can be made of any suitable material including metal, plastic, composites, or the like. In some embodiments, the shelves 142 are made of a corrosion resistant metal such as stainless steel or the like.

In some embodiments, the shelves 142 are part of a shelf support structure 144 that holds the shelves 142 in a spaced apart relationship in the vacuum chamber 102. The shelf support structure 144 is a self-supporting structure that can be inserted into and removed from the vacuum chamber 102. The shelf support structure 144 can be made of any of the materials described above in connection with the shelves 142.

Referring to FIG. 3, the back 116 of the housing 110 includes the power supply 129 for the freeze dryer 100. The power supply 129 includes a power switch and a power cord receptacle. A power cord can be coupled to the power cord receptacle to provide power to the freeze dryer 100.

FIGS. 4-6 show front and back perspective views of the freeze dryer 100 with the housing 110 removed to illustrate the interior components. The electronic controller 101 includes a circuit board 152 coupled to the display device 113. It should be appreciated that the circuit board 152 can have any suitable configuration. In some embodiments, the processor 103, the memory 105, the storage device 109, and the wired communication interface 127 are attached to and/or communicatively linked to or by way of the circuit board 152.

The electronic controller 101 can also include a pressure sensor 154 and one or more temperature sensors 156 that are communicatively linked to the processor 103. The pressure sensor 154 is exposed to the interior of the vacuum chamber 102 and used to measure the pressure in the vacuum chamber 102. The temperature sensors 156 are positioned on or adjacent to the shelves 142 (e.g., one temperature sensor 156 per shelf 142) and can be used to measure the temperature of: (i) the material being freeze dried, (ii) the shelf 142, and/or (iii) the interior of the vacuum chamber 102. The pressure sensor 154 and the temperature sensors 156 can use any suitable technology to measure the pressure and temperature including any of those described in greater detail below in the section dedicated to describing the electronic controller.

The electronic controller 101 can also include one or more relays 158 that activate the cooling system 104, the heating system 106, and/or the vacuum pump 108. For example, the electronic controller 101 can activate a relay 158 to turn the vacuum pump 108 on or off. Also, the electronic controller 101 can activate one or more relays 158 to turn the cooling system 104 or the heating system 106 (or individual heating elements in the heating system) on and off. The relays 158 can include electromechanical relays and/or solid-state relays, both of which are described in greater detail below in the section dedicated to describing the electronic controller 101.

The vacuum chamber 102 is formed by an inner cylinder 146 (alternatively referred to as an inner portion or inner section) positioned concentrically inside an outer cylinder 148 (alternatively referred to as an outer portion or outer section). The inner cylinder 146 is smaller than the outer cylinder 148 so that a gap or space is formed between them that is about 1-4 inches in size. The gasket 136 is coupled to the opening of the inner cylinder 146. The cylinders 146, 148 can be made of any suitable material including those described above in connection with the vacuum chamber 102.

The front of each cylinder 146, 148 is supported by the front 114 of the housing 110. The back of the cylinder 148 is supported by struts 150 (alternatively referred to as support struts, support members, or supports) coupled to the bottom of the outer cylinder 148 and the bottom 124 of the housing 110.

The cooling system 104 can broadly be considered to include the electronic controller 101, the temperature sensors 156, a compressor 160, a condenser 162, and an evaporator 164. The compressor 160, the condenser 162, and the evaporator 164 are fluidly linked by refrigerant fluid flowing through tubing or piping. The evaporator 164 is positioned in the space between the inner cylinder 146 and the outer cylinder 148. In some embodiments, the evaporator 164 includes tubing that wraps or is otherwise positioned around the inner cylinder 146. Also, in some embodiments, insulation can be positioned between the evaporator 164 and the outer cylinder 148 and/or on the outside of the outer cylinder 148 to inhibit heat transfer between the ambient environment and the vacuum chamber 102.

The cooling system 104 relies on a refrigerant cycle to cool the interior of the vacuum chamber 102. The refrigerant cycle can operate as follows. The refrigerant enters the compressor 160 as a low-pressure gas. The compressor 160 increases the pressure of the gas. The gas exits the compressor 160 as a high-pressure gas and flows to the condenser 162. The high-pressure gas condenses to a high-pressure liquid in the condenser 162, which gives off heat. A fan 166 blows on the condenser 162 to transfer heat away from the condenser 162 and out of the freeze dryer 100. The high-pressure liquid from the condenser 162 flows through an expansion valve that reduces the pressure of the liquid. The low-pressure liquid flows to the evaporator 164 where the low-pressure liquid evaporates to form the low-pressure gas. The change from a gas to a liquid absorbs heat from the interior of the vacuum chamber 102 and the inner cylinder 146. The low-pressure gas flows to the compressor 160 and the cycle repeats.

The heating system 106 can broadly be considered to include the electronic controller 101, the pressure sensor 154, the temperature sensors 156, one or more of the relays 158, and heating elements 168 positioned on the bottom of each shelf 142 (FIGS. 7-8). In some embodiments, the heating elements 168 are electric heating elements that can be turned on and off with one or more of the relays 158. For example, the heating elements 168 can be silicone heating pads.

The heating elements 168 are positioned in contact with the bottom side of the shelves 142. Heat from the heating elements 168 is conducted through the shelves 142 to the trays 180 (FIGS. 9-12) and from the trays 180 to the material being freeze dried. Heat from the heating elements 168 can also radiate downward from the heating elements 168 to the material on the trays 180.

The one or more temperature sensors 156 can be used to provide information to the electronic controller 101 about the temperature of the heating elements 168, the shelves 142, the trays 180, and/or the material being freeze dried. The electronic controller 101 can use the temperature information from each temperature sensor 156 to control each heating element 168 individually.

It should be appreciated that any number of heating elements 168 and/or temperature sensors 156 can be used to provide varying levels of control of the temperature of the material being freeze dried. For example, in some embodiments, a single heating element 168 is positioned in the vacuum chamber 102 and positioned to heat the material on the trays 180. In other embodiments, multiple heating elements 168 are positioned in the vacuum chamber 102 to provide more granular control over the heat provided to the material on the trays 180. For example, a heating element 168 can coupled to and configured to heat each shelf 142. Similarly, multiple heating elements 168 can be coupled to and configured to heat different portions or zones of each shelf 142—e.g., each shelf is heated by two, three, four, five, six, or more heating elements 168. This allows for granular control of the heating of the material, which generally produces higher quality results.

Likewise, any number of temperature sensors 156 can be used to control the heating elements 168 and thereby control the temperature of the material being freeze dried. For example, in some embodiments, a single temperature sensor 156 is positioned in the vacuum chamber 102 and used to measure the interior temperature. In other embodiments, multiple temperature sensors 156 are positioned in the vacuum chamber 102 to provide more granular control over the heat provided by the heating elements 168. For example, a temperature sensor 156 can be included for each heating element 168. The temperature sensor 156 can provide information used to control the amount of heat produced by the respective heating element 168. Likewise, a temperature sensor 156 can be included for each shelf 142 and/or each tray 180. It should also be appreciated that the temperature sensor 156 can be included for any number of heating elements 168, shelves 142, and/or trays 180.

The one or more temperature sensors 156 can be positioned in any suitable location. For example, in some embodiments, the temperature sensors 156 can be positioned between the heating element 168 and the shelf 142. With reference to FIG. 7, the temperature sensors 156 can be positioned between the bottom surfaces of the shelves 142 and the top surface of the heating elements 168.

Referring to FIGS. 7-8, in some embodiments, power from the relays 158 can be distributed to the heating elements 168 using a terminal block 172. In some embodiments, a temperature sensor 170 can be positioned in line with one or both wires supplying power to the terminal block 172. The temperature sensor 170 can function as a thermal cut off switch configured to cut power to the heating elements under certain conditions. For example, the temperature sensor 170 can cut power to the heating elements 168 when the measured temperature in the shelf area exceeds an upper value such as 95° C. (203° F.) and reset when the temperature reaches a lower value such as 75° C. (167° F.).

The wiring for the heating elements 168, the temperature sensors 156, and any other electronic components, passes through the wall of the vacuum chamber 102 by way of a wire pass through connector 157 (FIGS. 4-6). The wire pass through connector 157 provides an airtight connection and/or power link between the interior and exterior of the vacuum chamber 102. In some embodiments, the wire passthrough connector 157 includes an epoxy plug through which the wires pass into the vacuum chamber 102.

The use of the terminal block 172 as shown in FIGS. 7-8 is especially suitable for those embodiments where all the heating elements 168 are turned on and off together. In other embodiments such as those where the heating elements 168 are controlled separately from each other, the electronic controller 101 can include a sub-controller to which each heating element 168 or sub-combination of heating elements 168 is connected. The sub-controller can be used to provide power to and/or otherwise control the operation of each heating element 168 or sub-combination of heating elements 168. The sub-controller can include a circuit board and/or other hardware such as the relevant relays 158 to turn the heating elements 168 on and off. The sub-controller can be communicatively linked to the main controller shown in FIGS. 5-6. In some embodiments, the sub-controller can include any of the features described below in connection with the electronic controller 101.

The sub-controller can be positioned in any suitable location. For example, in some embodiments, the sub-controller can be coupled to the shelf support structure 144 in the vacuum chamber 102. For example, the sub-controller can be coupled to the back, side, or bottom of the shelf support structure 144. Also, in some embodiments, the sub-controller can be enclosed in a watertight housing. The housing can also be insulated if desired.

In some embodiments, the sub-controller can be used to control operation of the relays 158 and turn the heating elements 168 on and off as needed. In these embodiments, the sub-controller can also be communicatively linked to the temperature sensors 156. In other embodiments, the sub-controller can be controlled by the main controller. For example, the main controller can receive temperature measurements from the temperature sensors 156 and use them to turn the heating elements 168 on and off as needed. In yet other embodiments, the sub-controller can be eliminated and control of the heating elements 168 can be performed entirely by the main controller positioned outside the vacuum chamber 102. One advantage of using the sub-controller is that it reduces the number of wires that pass through the vacuum chamber 102 by way of the wire pass through connector 157.

FIGS. 7-8 also show front and back perspective views of the shelf support structure 144. The shelf support structure 144 is a rectangular structure formed by four vertical supports 174 (alternatively referred to as pillars or sides), a top 176, and a back 177. The vertical supports 174 are coupled to the sides of the shelves 142 at or adjacent to the corners of the rectangular shape. In some embodiments, the top 176 is structurally the same as one of the shelves 142 except it is positioned at the upper extreme of the shelf support structure 144 so there is no room to receive and hold a tray 180 of material to be freeze dried.

In some embodiments, the shelf support structure 144 includes insulation 178 coupled to the upper side of the top 176 and the bottom side of the lowermost shelf 142. The insulation 178 inhibits heat transfer from the heating elements 168 and/or the shelves 142 to the inner surface of the vacuum chamber 102, which should be kept cold to freeze and collect water vapor as ice or frost during the freeze-drying process. Accordingly, the insulation 178 helps prevent the ice or frost on the inner surface of the vacuum chamber 102 from melting before the freeze-drying process is complete.

One embodiment of a tray 180 is shown in FIGS. 9-14. The tray 180 includes a base 182 and a lid 184 (alternatively referred to as a cover). The lid 184 is configured to cover the base 182 in the manner shown in FIGS. 9-10. The base 182 and the lid 184 each have a flat bottom 188, 190 and sidewalls 192, 194 extending upward from the bottom 188, 190, respectively.

Figure 14:
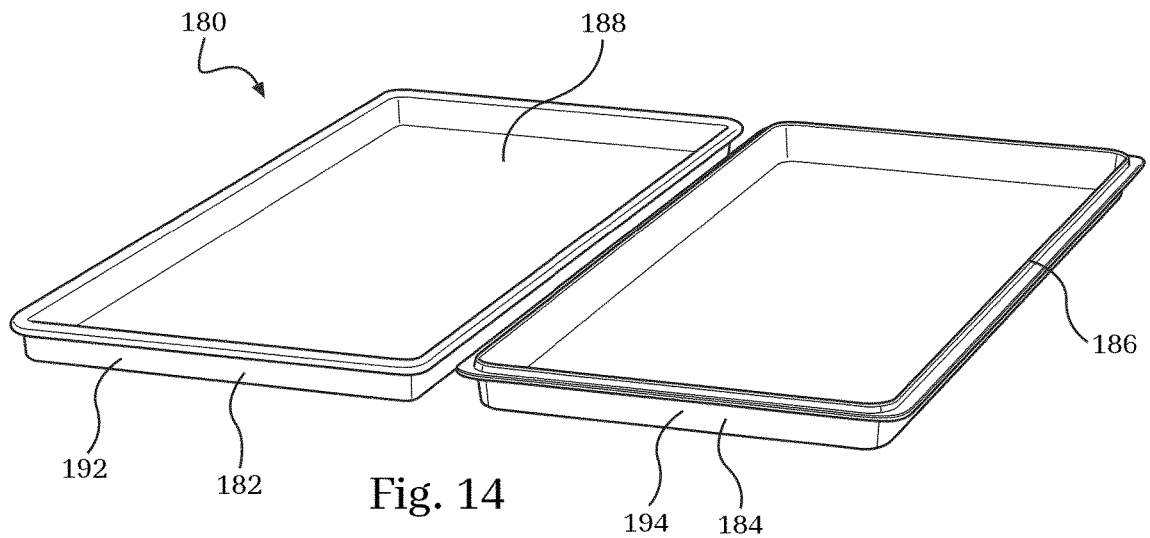
FIG. 14 is a perspective view of the tray in FIG. 9 showing the base and the lid positioned side by side (base on left, lid on right).

As best shown in FIG. 14, the lid 184 also includes a ridge 186 extending along an interior perimeter of the sidewalls 194. The ridge 186 extends outward in a direction away from the bottom 190 of the lid 184. The ridge 186 is sized to fit snuggly within the interior perimeter of the sidewalls 192 of the base 182. The ridge 186 helps hold the base 182 and the lid 184 together by preventing them from moving horizontally or side-to-side relative to each other.

The use of the lid 184 to cover the base 182 provides a number of advantages. One advantage is that multiple trays 180 filled with food or other material can be stacked on top of each other in the manner shown in FIG. 11. This makes it easy to stack multiple trays 180 in a freezer as part of a pre-freezing process. It also takes up less space in the freezer than uncovered trays stacked on shelves. Another advantage is that the lid 184 protects the material being freeze dried from exposure to air and spilling.

The base 182 and the lid 184 are also configured so that either one can be used to hold the material in the freeze dryer 100. For example, two of the bases 182 can be filled with material and placed on two of the shelves 142, and two of the lids 184 can be filled with material and placed on the other two shelves 142. This increases the versatility of both the base 182 and the lid 184. It should be appreciated that the base 182 and the lid 184 can be inverted so that the base 182 is on top and effectively functions as the lid and the lid 184 is on the bottom and effectively functions as the base. Accordingly, the term "tray" can refer to one or both the base 182 and/or the lid 184.

In some embodiments, the trays 180 are shaped so they can be nested together for storage and transportation purposes. For example, the sidewalls 192, 194 can extend upward and slightly outward from the bottoms 188, 190 to allow multiple bases 182 and lids 184 to nest together with the bottoms 188, 190 positioned adjacent to each other. For example, multiple lids 184 can nest together in the manner shown in FIGS. 12-13. Multiple bases 182 can nest together in the same or similar manner. It also possible for a combination of the bases 182 and the lids 184 to nest together. In this manner, the trays 180 can take up a minimum amount of space when not in use.

It should be appreciated that the trays 180 can be made of any suitable material. For example, in some embodiments, the trays 180 can be made of metal including corrosion resistant metals such as stainless steel. In some situations, the food or other material being freeze dried, especially those containing sugar, may stick to stainless steel trays 180 or otherwise leave a residue that needs to be scraped and/or scrubbed off.

In some embodiments, the trays 180 can be made entirely of a nonstick polymer material. It should be appreciated that a wide variety of nonstick polymer materials can be used to form the trays 180. For example, suitable nonstick polymer materials include polyolefins, especially food grade polyolefins such as polypropylene, polyethylene, or the like. Other suitable nonstick polymer materials include fluoropolymers such as polytetrafluoroethylene or the like, silicone polymers such as polysiloxane or the like, polycarbonates, or the like.

It should also be appreciated that the trays 180 do not necessarily need to be made entirely of the nonstick polymer material. For example, in some embodiments, the trays 180 can be partially or completely coated with the nonstick polymer material. Likewise, in some embodiments, a removable liner of the nonstick polymer material (e.g., polysiloxane liner) can be placed on the trays 180. The removable liner can be flat and approximately match the surface area of the bottoms 188, 190 of the trays 180, or the removable liner can include a flat area and upward extending sidewalls that approximately match the shape of the trays 180. For example, in the latter case, the removable liner can be a flexible polymer material (e.g., polysiloxane) having a pliant shape that approximately corresponds to the interior shape of the trays 180. Likewise, the removable liner can be configured to avoid interfering with the ability to place the lid 184 on the base 182 or vice versa—e.g., the removable liner may only extend up the sidewalls a distance that does not interfere with putting the base 182 and lid 184 together.

The trays 180 can also have a variety of shapes and/or sizes besides what is shown in FIGS. 9-14. For example, the trays 180 can be circular, oblong, square, or the like.

Initial Setup and Testing

The electronic controller 101 of the freeze dryer 100 can also include initial setup and testing procedures that can be used by the user or a service technician to setup and/or test the freeze dryer 100. It should be appreciated that the setup and testing procedures can take a number of forms and be provided in a number of ways. In some embodiments, the setup and testing procedures are stored as software or firmware in the electronic controller 101 and accessed through a series of menus displayed on the display device 113.

The initial setup can include tasks such as setting the time and/or date, entering the serial number, calibrating the pressure sensor 154, calibrating the temperature sensors 156, and/or manually operating the cooling system 104, the heating system 106, the vacuum pump 108, and/or an automatic drain valve. Calibrating the sensors 154, 156 can include comparing them to the pressure or temperature obtained from a device that is separate from the freeze dryer 100 such as a pressure gauge or thermometer.

The testing procedures can include any of a variety of tests used to confirm the freeze dryer 100 is operating properly. In some embodiments, the testing procedures include activating the cooling system 104, the heating system 106, and/or the vacuum pump 108 and determining that each system or component meets one or more criteria.

For example, testing the cooling system 104 can including turning it on for a preset amount of time and measuring the temperature in the vacuum chamber 102. If the temperature has dropped sufficiently to meet the criteria, then the cooling system 104 is determined to have passed the test. In another example, testing the cooling system 104 can include turning it on for a preset amount of time, opening the door 132, and confirming the system is cooling visually and/or by touch.

Testing the heating system 106 can include turning it on for a preset amount of time and measuring the temperature of the heating elements 168, the shelves 142, or the interior of the vacuum chamber 102. If the temperature has increased sufficiently to meet the criteria, then the heating system 106 is determined to have passed the test. In another example, testing the heating system 106 can include turning it on for a preset amount of time, opening the door 132, and touching each heating element 168 to confirm it is warm.

Testing the vacuum pump 108 can include turning it on for a preset amount of time and measuring the pressure in the vacuum chamber 102. If the pressure has dropped sufficiently to meet the criteria, then the vacuum pump 108 is determined to have passed the test.

The tests can be performed separately or together as part of a testing sequence. For example, the user or technician can start each test separately by pressing a corresponding button on the display device. Alternatively, the user or technician can press a single button that begins a testing sequence that performs one or more of the tests sequentially.

Freeze-Drying Process

Broadly speaking, a freeze-drying process or method includes a freezing phase and a drying phase. The freezing phase includes freezing the material to a sufficiently low temperature so that it can be successfully dried through sublimation. The drying phase includes heating the frozen material in vacuum pressure conditions to remove water through sublimation and/or desorption. The freeze-drying process can include additional phases or steps, and the freezing and drying phases can be divided into subphases.

Figure 15:
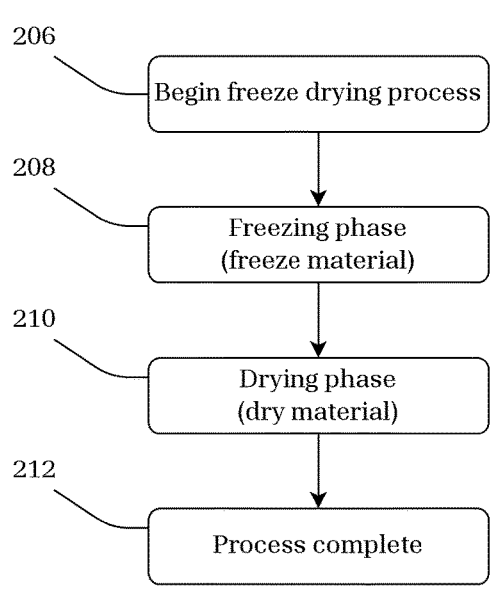
FIGS. 15-17 are flowcharts of various embodiments of freeze-drying processes.

FIG. 15 is a flowchart of one embodiment of a freeze-drying process 200. The process 200 begins at step 206 and includes a freezing phase 208 and a drying phase 210. The process is complete at step 212. This embodiment shows the basic phases of a freeze-drying process.

Figure 16:
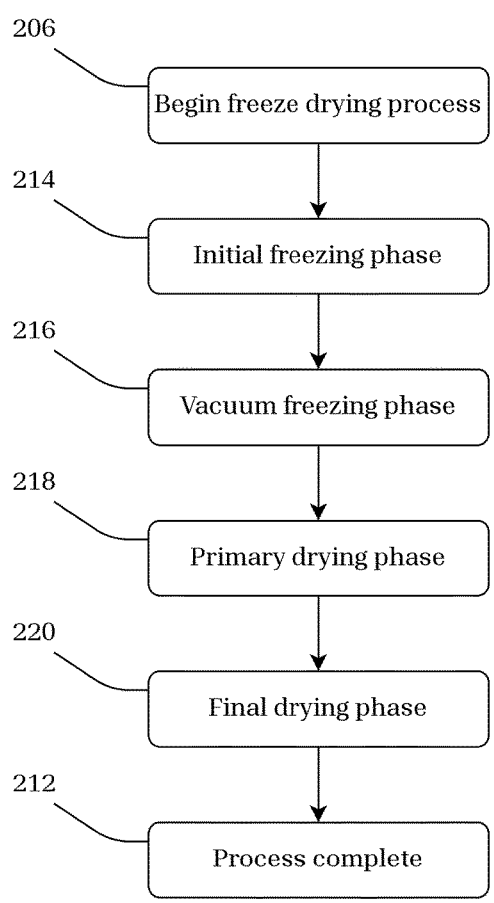

FIG. 16 is a flowchart of another embodiment of a freeze-drying process 202. The process 202 is similar to the process 200 except the freezing phase 208 is divided into an initial freezing phase 214 and a vacuum freezing phase 216. The drying phase 210 has also been divided into a primary drying phase 218 and a final dry phase 220. This is an example of a process that falls under the umbrella of the freeze-drying process 200 but includes more granular phases.

The initial freezing phase 214 includes freezing the material at or near atmospheric pressure to a first temperature or below. The vacuum freezing phase 216 includes freezing the material in vacuum pressure conditions to a second temperature or below. The primary drying phase 218 includes removing water from the material primarily or entirely through sublimation. The final dry phase 220 includes removing the last remaining water from the material and involves increasingly removing water through desorption.

Figure 17:
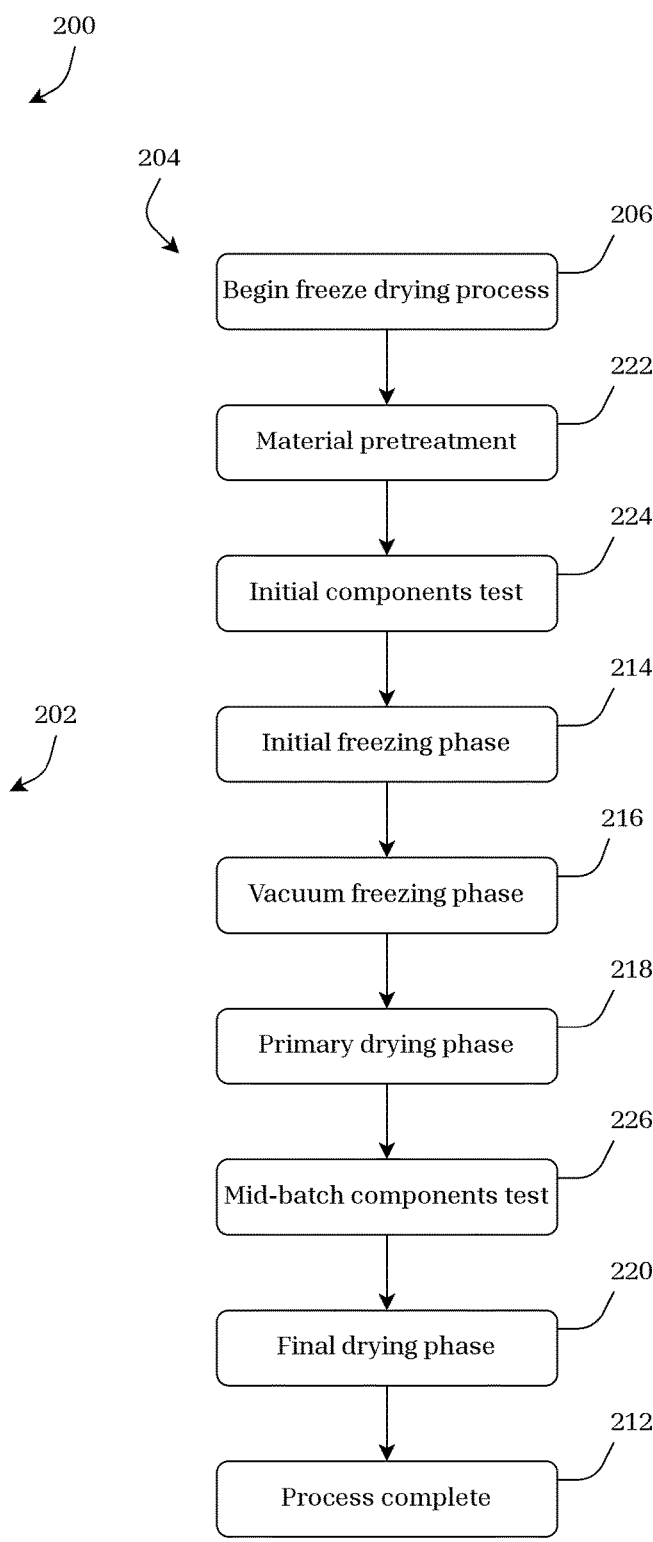

FIG. 17 is a flowchart of another embodiment of a freeze-drying process 204. The process 204 is similar to the process 202 in that both include phases 214, 216, 218, 220. However, the process 204 also includes a material pretreatment step 222, an initial components test 224, and a mid-batch components test 226. It should be appreciated that the freeze-drying process can include a variety of phases and/or steps beyond what is depicted in FIGS. 16-17. For example, the freeze-drying process can include any combination of the phases 214, 216, 218, 220 and steps 222, 224, 226 in any suitable order. The freeze-drying process can also include additional phases and/or steps in any combination with those shown in and described in connection with FIG. 16-17

It should be appreciated that the freeze-drying processes 200, 202, 204 can be used with any suitable freeze dryer. For example, in some embodiments, the processes 200, 202, 204 can be used with the freeze dryer 100 described above. In other embodiments, the processes 200, 202, 204 can be used with any of the freeze dryers described in the incorporated documents.

It should also be appreciated that the freeze-drying processes 200, 202, 204 can be implemented or controlled by the electronic controller 101. For example, the processes can be implemented as software or firmware for the freeze dryer 100.

Material Pretreatment

The material can be pretreated to make it easier to freeze dry or to otherwise produce a higher quality product. Although pretreatment is optional, it is often helpful to better prepare the material for freeze-drying. Generally speaking, pretreatment includes any method of treating the material before it is placed in the freeze dryer 100.

Pretreatment of the material can include a variety of processes. For example, in some embodiments, pretreatment includes concentrating the material (e.g., removing liquid water), combining the material with one or more additives to increase stability, preserve appearance, and/or improve processing, physically modifying the material to increase the surface area, or the like. The decision to pretreat a material is often determined based on cycle time and/or product quality considerations.

Pretreatment of the material can also include pre-freezing it before placing it in the freeze dryer 100. One of the primary advantages of pre-freezing the material is that large quantities of food can be pre-frozen using conventional processes, which can shorten the overall freeze-drying processing time by reducing the time required to freeze the material in the freezing phase 208. Generally speaking, however, the temperature of the material after pre-freezing is usually not low enough to skip the freezing phase 208 entirely.

It should be appreciated that the material can be pre-frozen in any suitable manner. For example, in some embodiments, large quantities of the material can be pre-frozen in a conventional freezer positioned near or at the same location as the freeze dryer 100. Likewise, in some embodiments, the material can be pre-frozen through IQF (individual quick freezing) processes or the like. Examples of suitable food items for IQF include berries, fruits, vegetables, seafood such as shrimp and small fish, meat, poultry, pasta, cheese, and grains.

One advantage of the IQF process is that it freezes the material quickly, which reduces the formation of large ice crystals in the material's cells that can destroy the membrane structures at a molecular level. This helps the material retain its shape, color, smell, and taste when it is rehydrated.

Settings

The freeze dryer 100 can include one or more settings the user can adjust prior to beginning the freeze-drying process. For example, in some embodiments, the user can adjust the initial freeze temperature, the dry temperature, and/or the default amount by which the user can extend the final dry.

The initial freeze temperature is the temperature at which the freezing phase 208 switches from the initial freezing phase 214 to the vacuum freezing phase 216—i.e., the temperature at which the vacuum pump 108 is turned on. The initial freeze temperature can be determined based on the temperature of the material being freeze dried, the trays 180, the shelves 142, or the interior of the vacuum chamber 102. The material is cooled in the freeze dryer 100 in the initial freezing phase 214 until the relevant temperature drops to or below the initial freeze temperature. At this point, the vacuum pump 108 turns on and the vacuum freezing phase 216 begins.

The user can adjust the initial freeze temperature based on the characteristics of the material being freeze dried. Generally speaking, vacuum freezing cools the material faster than freezing at atmospheric pressure, which means it is preferable to begin vacuum freezing at higher temperatures. However, for certain materials, vacuum freezing can adversely affect the texture and/or other characteristics if vacuum pressure conditions are applied before the material is frozen enough to maintain its structural integrity. This setting allows the user to customize the initial freeze temperature to accommodate different types of material.

The dry temperature is the maximum allowable temperature during the drying phase 210. The dry temperature can refer to the maximum temperature of the material, the trays 180 and/or the shelves 142. When this temperature is reached during the drying phase 210, the heating system 106 shuts off. The user can adjust the dry temperature based on the characteristics of the material being freeze dried. For example, in some embodiments, the dry temperature can be adjusted to any temperature between 75° F. and 150° F. in one-degree or five-degree increments. Generally speaking, lowering the dry temperature can improve the appearance of many freeze-dried materials but also increases the drying time.

The user can also set the default amount of time by which the final dry can be extended when the process is complete. For example, the default time by which the final dry can be extended may be two hours. The user can increase or decrease this amount in the settings. When the freeze-drying process 200, 202, 204 is complete, the display device 113 can present the user with the option to extend the final dry by the default amount set in the settings.

Candy Process

The freeze dryer 100 can include a process dedicated to drying materials having low water content and/or high sugar content such as candy, confections, sweets, and the like. The process is referred to as a candy process in the following description, but it should be appreciated that it is not limited to only drying candy and can be used to dry any material with low water content. It should also be appreciated that candy, confections, sweets, and the like can also be dried using any of the freeze-drying processes described elsewhere.

A material is considered to have low water content if it has no more than 20 wt % water. In some embodiments, the material includes 1-20 wt % water. In some embodiments, the material includes no more than 20 wt % water, no more than 18 wt % water, no more than 15 wt % water, no more than 12 wt % water, no more than 10 wt % water, no more than 8 wt % water, no more than 5 wt % water no more than 3 wt % water, or no more than 1 wt % water.

The material can also have a high sugar content—i.e., at least 20 wt % sugar. The sugar content refers to the total sugars measured in accordance with the criteria for reporting the "Total Sugars" on the Nutrition Facts label as established by the U.S. Food and Drug Administration. In some embodiments, the material includes 20-100 wt % sugar. In some embodiments, the material includes at least 20 wt % sugar, at least 25 wt % sugar, at least 30 wt % sugar, at least 35 wt % sugar, or at least 40 wt % sugar.

The candy process is especially suitable for drying candy because it has low water content and high sugar content. The candy process can be used to dry a variety of candy. Examples of suitable candy includes Skittles, saltwater taffy, Jolly Ranchers, Milk Duds, Gummy Bears, Big Hunk, Starburst, and the like. The sugar in candy can cause it to bubble or expand similarly to how popcorn pops (e.g., Skittles) or swell into a round shape that resembles an egg (e.g., saltwater taffy). The texture and mouth feel of the candy can also change. For example, candy that is chewy can become crunchy when it is dried.

The candy process differs from a typical freeze-drying process in a number of ways. Most material that is freeze dried has a relatively high water content, which is one reason it is frozen before it is dried. However, a material with a low water content can be dried without being frozen in advance. The material is sufficiently robust and the water content is low enough that the material is not adversely affected by removing the water when it is not frozen.

Some materials with low water content not only do not need to be frozen before the drying phase, but they can be heated before the drying phase to enhance the characteristics of the dried material. Although not wishing to be bound by theory, it is speculated that heating the material in advance makes it easier for the water vapor to expand the material and give it a distinct dried characteristic.

The material can be heated with the heating system 106 in any of the ways described above. The material can be heated to or at any suitable temperature. For example, the material can be heated to or at at least 100° F., at least 110° F., at least 120° F., or at least 130° F. The material can also be heated to or at any temperature between 100-200° F.

Figure 18:
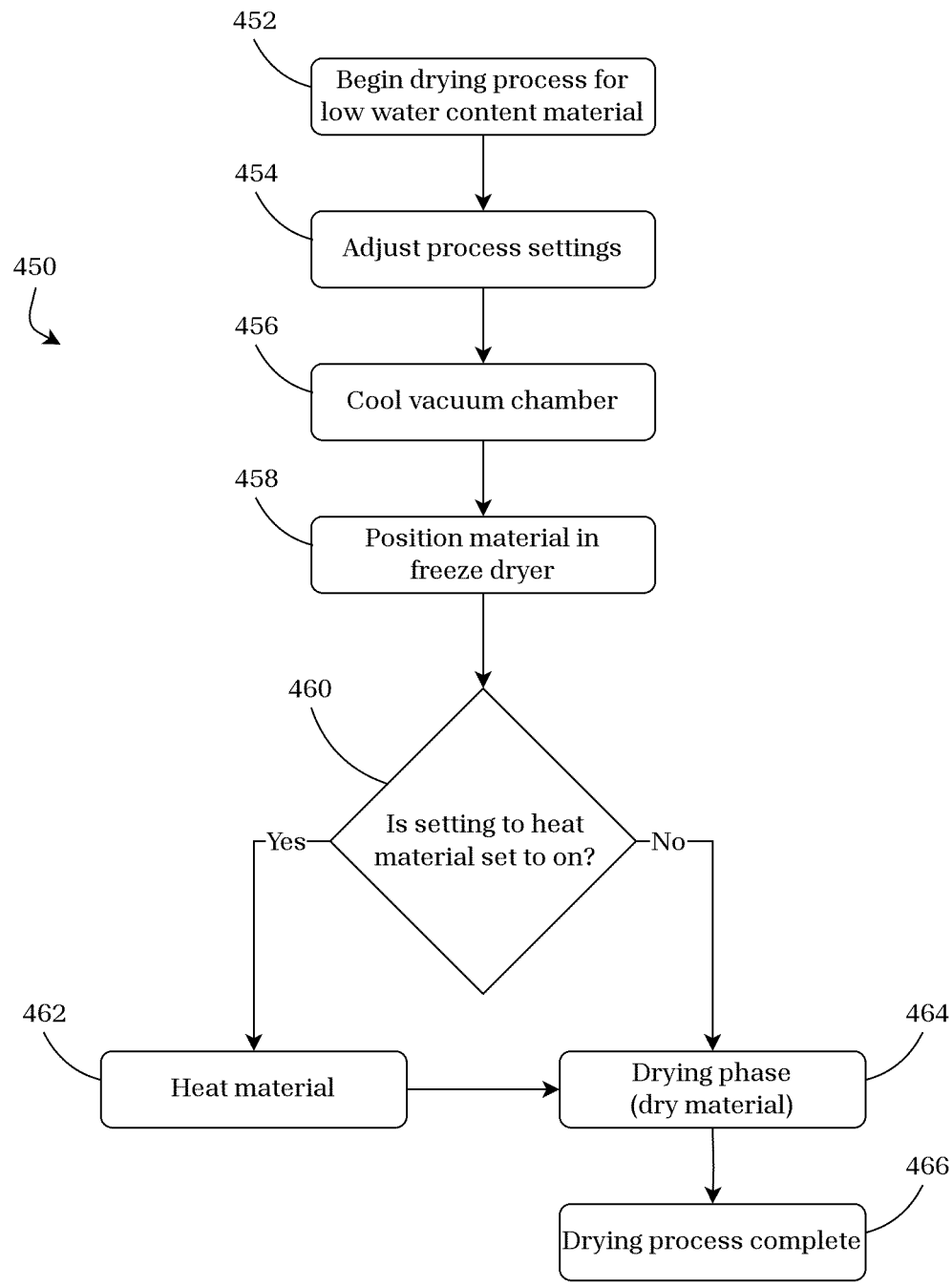
FIG. 18 is a flowchart of one embodiment of a process for drying materials with low water content.

FIG. 18 is a flowchart of one embodiment of a candy process 450. The candy process 450 begins at step 452, which can include displaying an option to begin the candy process 450 on the display device 113 and receiving input from the user selecting the candy process 450.

The user can optionally adjust the settings for the candy process 450 at step 454. This can include displaying relevant settings on the display device 113 and receiving input from the user to change the settings. The settings can include parameters such as the dry temperature (e.g., the temperature set point to which the shelves 142 are heated), the dry time (e.g., the amount of time the material is in the drying phase), an option to heat the material, and a setting for the amount of time the material is heated.

Any suitable values can be selected for the settings. For example, the dry temperature can be any temperature from 70-200° F. In some embodiments, the dry temperature can be at least 100° F., at least 110° F., at least 120° F., or at least 130° F. The dry time can be any amount of time from 10 minutes to 10 hours. In some embodiments, the dry time can be 1-4 hours. The heat time can be any amount of time from 1-120 minutes. In some embodiments, the heat time is 1-30 minutes. In other embodiments, the heat time is at least 1 minute, at least 2 minutes, or at least 3 minutes.

After the user has adjusted the settings, the electronic controller 101 begins cooling the vacuum chamber 102 of the freeze dryer 100 at step 456. This is done so that the interior walls are cold enough to freeze and collect the water vapor from the material during the drying phase.

The material is positioned in the freeze dryer 100 at step 458. In some embodiments, the display device 113 can display a message instructing the user to load the material in the freeze dryer 100 when the vacuum chamber 102 is done cooling. Once the material is loaded in the freeze dryer 100, the electronic controller 101 can receive input from the user to continue the candy process 450.

It should be appreciated that the freeze dryer 100 does not freeze the material at this point in the candy process 450 like it would in a typical freeze-drying process. The material may cool somewhat when it is first placed in the vacuum chamber 102, but it is not exposed to low enough temperatures for a long enough time to freeze.

The electronic controller 101 determines whether the setting to heat the material is set to "On" at step 460. The setting can be set by the user at step 454. If the setting is set to on, then the electronic controller 101 heats the material at step 462. In some embodiments, this includes heating the material in a two-step process. The first step is to heat the shelf 142 to the dry temperature, and the second step is to maintain the shelf 142 at the dry temperature for the heat time. In other embodiments, heating the material can include heating the shelf 142 for a set amount of time regardless whether the amount of time is sufficient for the shelf 142 to reach the dry temperature or how long the shelf 142 will be at the dry temperature. After the material is heated, the candy process 450 goes to the drying phase 464. Also, if the setting to heat the material is set to "Off" at step 460, then the candy process 450 goes directly to the drying phase 464.

The drying phase 464 is when the vacuum pump 108 is turned on and the pressure in the vacuum chamber 102 is reduced below ambient pressure. The pressure can be reduced to any of the values described elsewhere when the vacuum pump 108 is turned on. Preferably, the pressure in the vacuum chamber 102 is no more than 5000 mTorr.

The material is dried in the drying phase 464 for the amount of time set for the dry time in the settings. Because the material has low water content, it is preferable to set the drying phase 464 for a set amount of time rather than use sensors to detect when the material is fully dried. Also, it generally takes less time to dry the material than it does material with high water content.

The candy process is complete at step 466. The material is removed from the freeze dryer 100 and the interior of the vacuum chamber 102 is allowed to defrost. Alternatively, another batch of the material can be dried with the candy process 450 without defrosting the interior of the vacuum chamber 102. This is possible because the material has low water content so, consequently, not much water is collected on the interior of the vacuum chamber 102.

Figure 19:
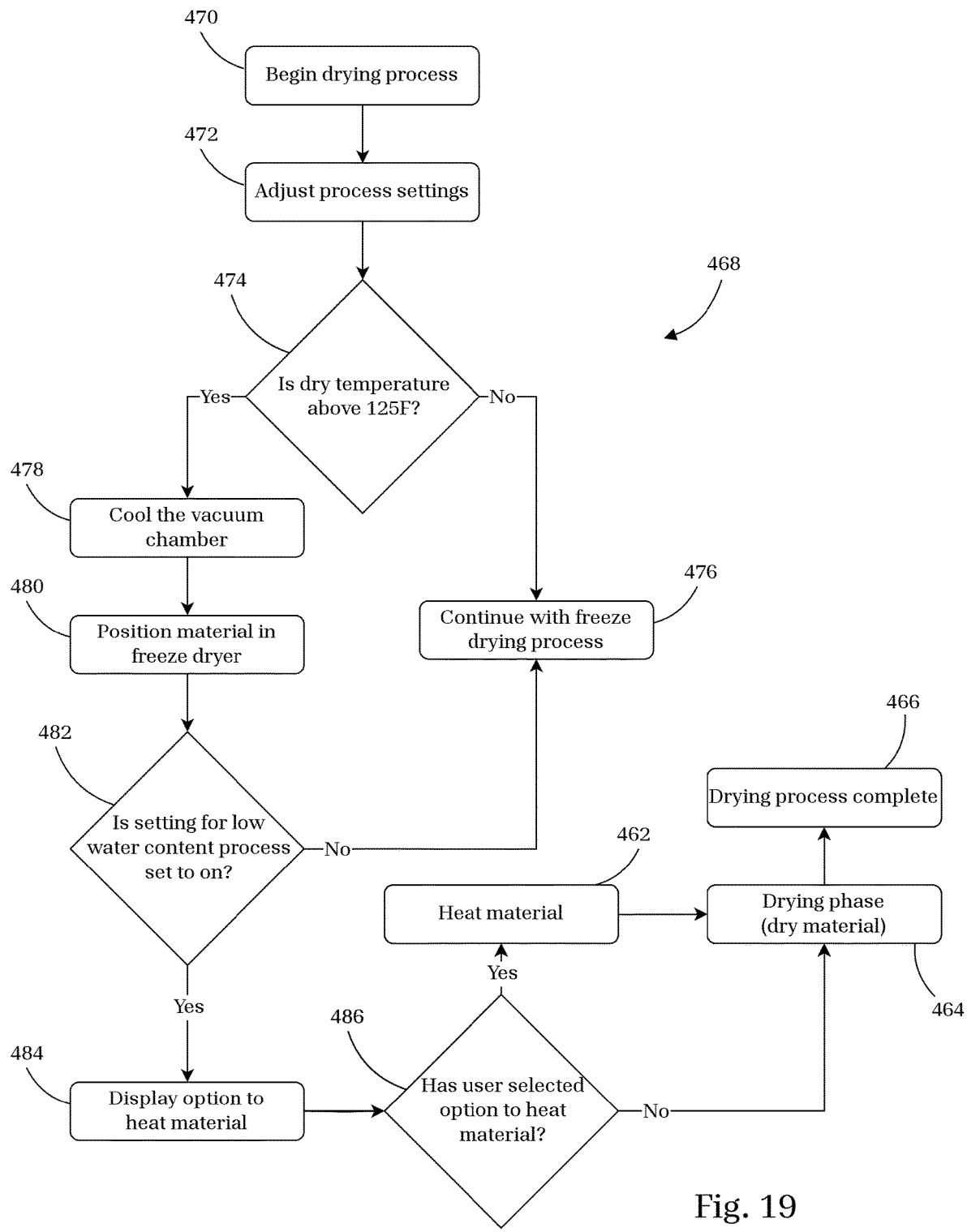
FIG. 19 is a flowchart of another embodiment of a process for drying materials with low water content.

FIG. 19 is a flowchart of another embodiment of a candy process 468. The candy process 468 is similar in many ways to the candy process 450. Accordingly, it should be appreciated that the details of the candy process 450 apply equally to the candy process 468 unless noted otherwise.

The candy process 468 begins at step 470, which can include displaying an option to start a drying process on the display device 113 and receiving input from the user to start the process. The user can optionally adjust the settings for the candy process 468 at step 472. The electronic controller 101 determines whether the dry temperature is above 125° F. at step 474. If the dry temperature is at or below 125° F., then the process continues as a typical freeze-drying process 476. The freeze dryer 100 does not run the candy process 468.

If the electronic controller 101 determines the dry temperature is above 125° F. at step 474, then it cools the vacuum chamber 102 at step 478. When the vacuum chamber 102 is sufficiently cool, then the electronic controller 101 displays a message for the user to position the material in the freeze dryer 100 at step 480. It also displays a setting to specify that the process is used to dry material with low water content.

When the material is positioned in the freeze dryer 100, the electronic controller 101 determines whether the setting for processing material with low water content is turned "On" at step 482. If the setting is turned off, then the process continues as a typical freeze-drying process 476 with the dry temperature set above 125° F. If the setting is turned on, then the candy process 468 continues at step 484 by displaying an option to heat the material on the display device 113.

The electronic controller 101 determines whether the user has selected the option to heat the material at step 486. If the user selected to heat the material, then the candy process 468 continues by heating the material at step 462. If the user did not select to heat the material, then the candy process 468 goes directly to the drying phase 464. The remainder of the candy process 468 is the same as the candy process 450.

EXAMPLES

The following examples are provided to further illustrate the disclosed subject matter. They should not be used to constrict or limit the scope of the claims in any way.

Example 1—Candy Process 1

In this example, the freeze dryer 100 is used to dry candy, confections, or other materials having low water content (no more than 20 wt % water content). The process is referred to as a candy process because it is commonly used to dry candy. However, it should be appreciated that other materials with low water content can also be dried using the process.

Figure 20:
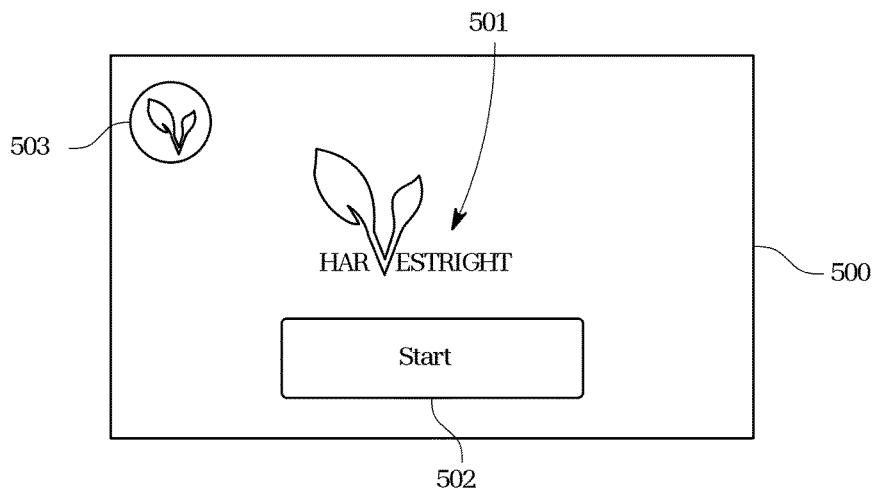
FIG. 20 is an illustration of one embodiment of a screen shown on the display device of a freeze dryer at startup.
Figure 21:
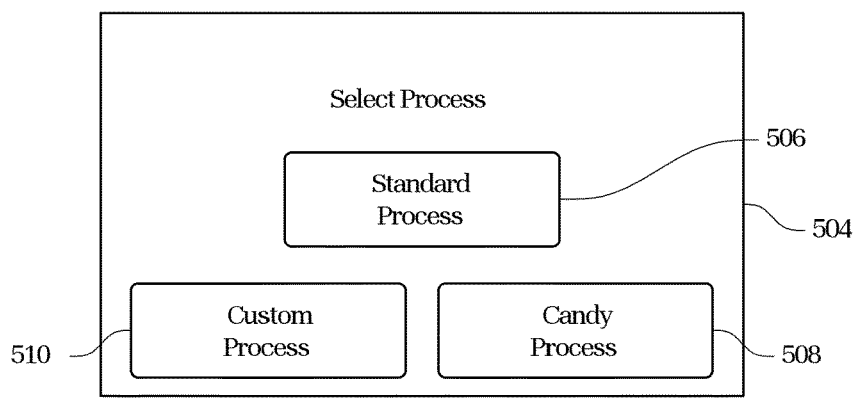
FIG. 21 is an illustration of one embodiment of a screen shown on the display device of the freeze dryer after the user presses "Start" on the screen shown in FIG. 20. The screen shows the processes that the freeze dryer can run.

The freeze dryer 100 is powered on and the display device 113 displays a start screen 500 as shown in FIG. 20. The start screen 500 includes the Harvest Right name 501, a start button 502, and a circle leaf logo 503 in the upper left corner. The user presses the start button 502. The display device 113 displays a screen 504 as shown in FIG. 21. The screen 504 prompts the user to select a drying process.

The screen 504 includes a standard process button 506, a custom process button 508, and a candy process button 510. The buttons 506, 508 are described for completeness even though they are not used in the candy process. Pressing the standard process button 506 runs a standard freeze-drying process with preset settings applicable to a wide variety of materials (e.g., initial freeze temperature of −10° F., extra freeze time of 1 hr, normal dry mode, dry temperature of 125° F., and extra dry time of 2 hrs). Pressing the custom process button 508 opens a screen of settings that allow the user to customize the freeze-drying process.

Figure 22:
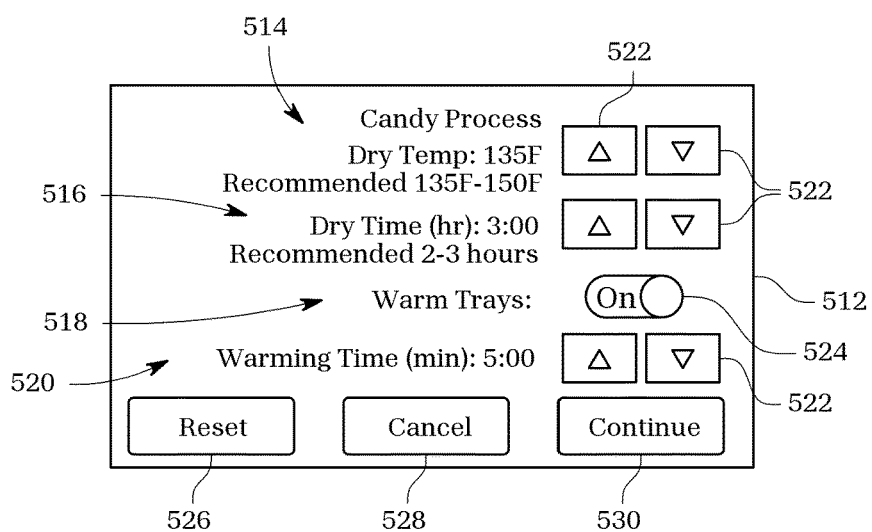
FIG. 22 is an illustration of one embodiment of a screen shown on the display device of the freeze dryer after the user presses "Candy Process" on the screen shown in FIG. 21. The screen shows the settings for a candy process.

The user presses the candy process button 510. The display device 113 displays a screen 512 with the settings for the candy process as shown in FIG. 22. The screen 512 and subsequent screens are labeled at the top with "Candy Process" to inform/remind the user that the freeze dryer 100 is operating in candy mode. This helps prevent the user from inadvertently using the candy process with unsuitable material.

The candy process differs from a typical freeze-drying process in a couple of ways. First, the candy process skips the step of freezing the material. The material is loaded into the freeze dryer 100 and dried under vacuum conditions without being frozen first. The candy process can do this because the water content is low enough that the material will not collapse or otherwise be adversely affected when it is dried. In fact, not freezing the material and, in some cases, heating the material can enhance the characteristics of the dried material. In contrast, materials that do not have low water content should be frozen before being dried to prevent them from collapsing and/or otherwise being adversely affected when dried.

Second, the drying phase of the candy process is performed for a set amount of time instead of relying on the electronic controller 101 to determine when it is done. Third, the candy process can include an optional step of warming or heating the material before the pressure is reduced in the vacuum chamber 102 and the drying phase begins. Heating some materials in this manner enhances the physical characteristics of the dried material such as mouth feel, flavor, and the like.

The user can adjust the following settings on the screen 512: the dry temperature 514, the dry time 516, and the option to warm the trays 518 for an adjustable amount of warming time 520 before the dry phase begins. The dry temperature 514, the dry time 516, and the warming time 520 can be adjusted using the up and down buttons 522. The warm trays option 518 can be selected with the On/Off button 524. The user adjusts the settings based on the material being dried.

The dry temperature 514 is the temperature to which the shelves 142 are heated during the candy process. The screen 512 includes a recommendation that the dry temperature 514 be set between 135-150° F. The dry temperature 514 for the candy process is generally higher than the dry temperature used in other freeze-drying processes.

The dry time 516 is the amount of time for the drying phase—i.e., the amount of time the material is dried in vacuum conditions. The screen 512 includes a recommendation that the dry time 516 be set between 2-3 hours, which is sufficient to dry most materials having low water content.

The bottom of the screen 512 includes a reset button 526, a cancel button 528, and a continue button 530. Pressing the reset button 526 resets the settings on the screen 512 to their default values. Pressing the cancel button 528 cancels the candy process and returns the display device 113 to the start screen 500. The cancel button 528 is shown on a number of subsequent screens and functions the same.

Figure 23:
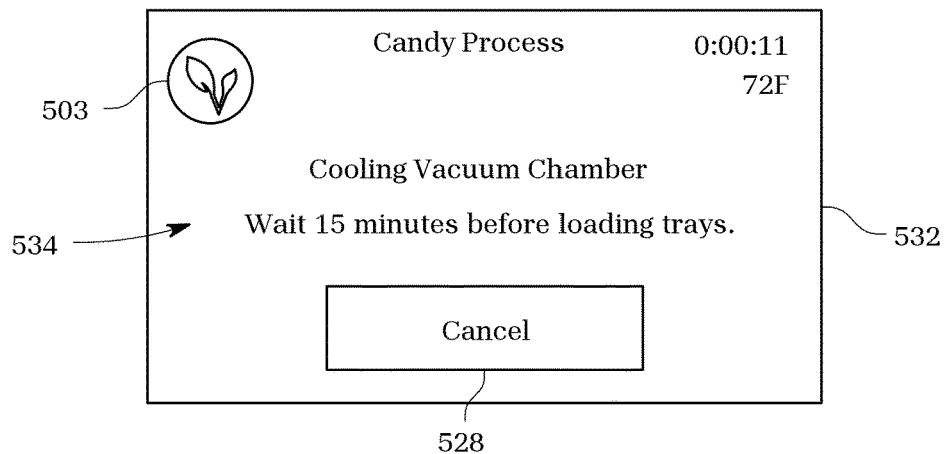
FIG. 23 is an illustration of one embodiment of a screen shown on the display device of the freeze dryer after the user presses "Continue" on the screen shown in FIG. 22. The screen shows a message informing the user that the vacuum chamber is cooling.

The user continues the candy process by pressing the continue button 530. The display device 113 displays a screen 532 as shown in FIG. 23. The screen 532 includes a message 534 that the freeze dryer 100 is cooling the vacuum chamber 102 and it will be about 15 minutes before it is time to load the trays 180.

Figure 24:
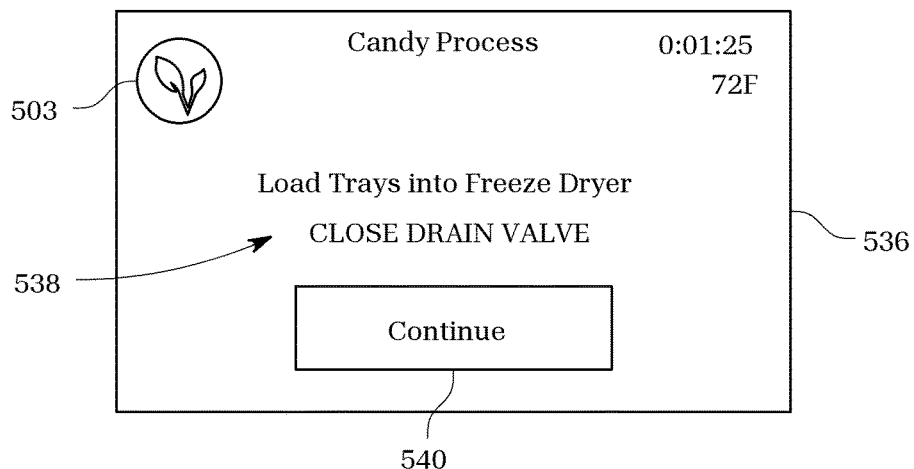
FIG. 24 is an illustration of one embodiment of a screen shown on the display device of the freeze dryer when the interior of the freeze dryer is sufficiently cool to load the trays. The screen shows a message instructing the user to load the trays in the freeze dryer and close the drain valve.

The electronic controller 101 controls the cooling process. The cooling system 104 cools the interior walls of the vacuum chamber 102 until they are cold enough for water vapor to freeze on them. At this point, the display device 113 displays a screen 536 as shown in FIG. 24. The screen 536 includes a message 538 to load the trays 180 into the freeze dryer 100 and close the drain valve. The screen 536 also includes a continue button 540.

Figure 25:
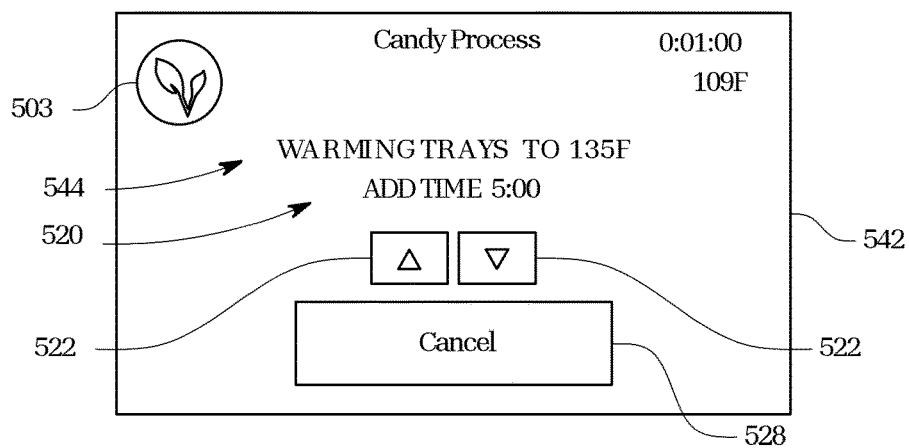
FIG. 25 is an illustration of one embodiment of a screen shown on the display device of the freeze dryer after the user presses "Continue" on the screen shown in FIG. 24. The screen shows a message informing the user that the trays in the freeze dryer are warming.

The user loads the trays 180 onto the shelves 142 in the freeze dryer 100. The shelves 142 are relatively cold from the cooling process. The user presses the continue button 540. The display device 113 displays a screen 542 as shown in FIG. 25. The screen 542 includes a message 544 that the trays 180 are warming to 135° F., which is the dry temperature 514. The message 544 is displayed until the trays 180 reach the set temperature and then it changes to the screen shown in FIG. 26. The screen 542 also displays the warming time 520 and includes up and down arrows 522 so the user can adjust it.

Figure 26:
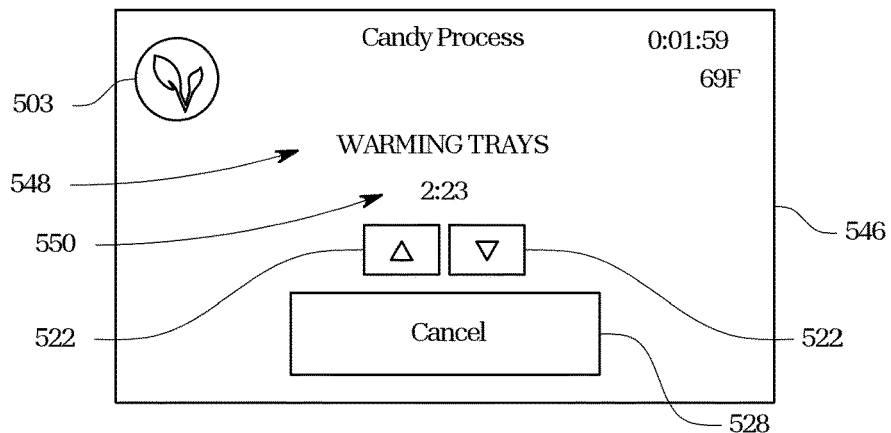
FIG. 26 is an illustration of one embodiment of a screen shown on the display device of the freeze dryer after the set temperature on the screen shown in FIG. 25 is reached. The screen shows a countdown timer of the remaining warming time.

The warming time 520 begins to count down when the trays 180 reach the set temperature. When this happens, the display device 113 displays a screen 546 as shown in FIG. 26. The screen 546 includes a message 548 that the trays 180 are warming and a countdown timer 550 showing the remaining warming time 520. The screen 546 also includes up and down arrows 522 so the user can adjust the warming time as it counts down.

Figure 27:
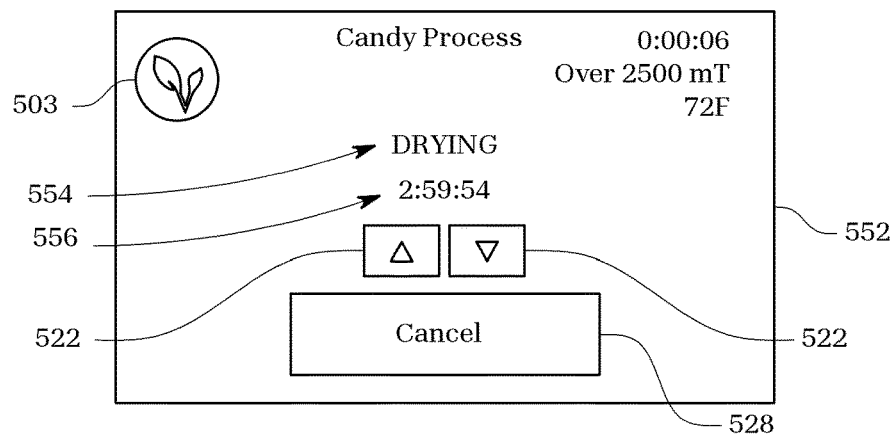
FIG. 27 is an illustration of one embodiment of a screen shown on the display device of the freeze dryer after the trays have been warmed for the time shown on the screen in FIG. 26. The screen shows a message that the material in the freeze dryer is drying along with a countdown timer for the remaining drying time.

When the warming time 520 expires, the electronic controller 101 turns on the vacuum pump 108 and the display device 113 displays a screen 552 as shown in FIG. 27. The screen 552 includes a message 554 that the material is drying and a countdown timer 556 shows the remaining dry time 516. The screen 552 also includes up and down arrows 522 so the user can adjust the dry time as it counts down.

It should be noted that if the warm trays option 518 is turned off on screen 512, then the drying phase will begin immediately after the trays 180 are loaded and the user presses the continue button 540 in FIG. 24. The trays 180 will not be warmed before the vacuum pump 108 is turned on and the screens 542, 546 will not be displayed.

Figure 28:
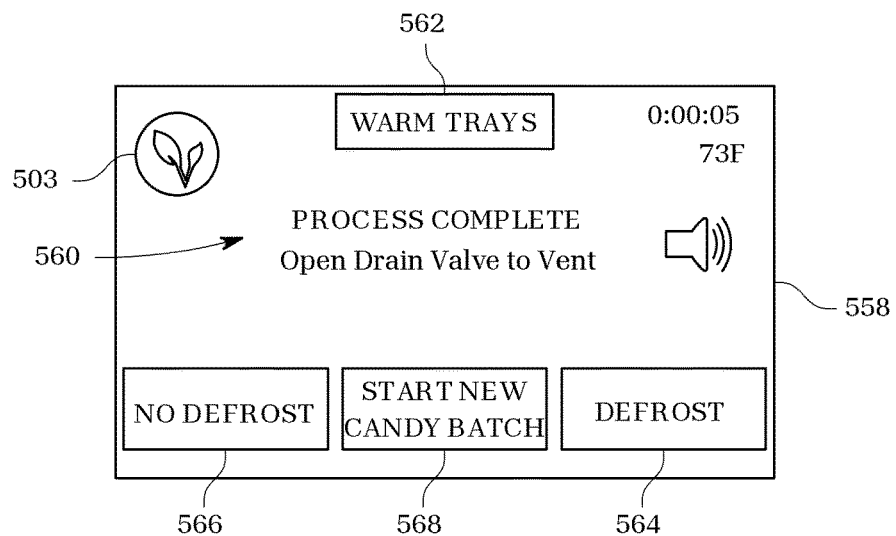
FIG. 28 is an illustration of one embodiment of a screen shown on the display device of the freeze dryer after the drying process has finished. The screen shows a message that the process is complete.

When the material has dried for the set amount of time (e.g., the dry time 516 plus or minus any adjustments made on screen 552), the electronic controller 101 turns off the vacuum pump 108 and the display device 113 displays a screen 558 as shown in FIG. 28. The screen 558 includes a message 560 that the candy process is complete and an instruction to open the drain valve to vent the vacuum chamber 102.

The screen 558 also includes a warm trays button 562. The trays 180 are warm at the end of the candy process. However, the freeze dryer 100 is configured to freeze the material when the process ends to prevent the material from spoiling by being left too long in an ambient environment. In other words, the freeze dryer 100 functions like a freezer at the end of the process to prevent the material from going bad while waiting for the user to remove it. If the material and the trays 180 are cold when the user wants to remove them, then the user can press the warm trays button 562 to warm the trays 180 before removing them.

The screen 558 also includes a defrost button 564, a no defrost button 566, and a start new candy batch button 568. Pressing the defrost button 564 or the no defrost button 566 ends the candy process and causes the vacuum chamber 102 to either begin or skip the defrost process, respectively. The display device 113 displays the start screen 500.

The start new candy batch button 568 can be used to immediately begin another candy process without defrosting the interior walls of the vacuum chamber 102. It is possible to begin a new candy process without defrosting the interior because the candy process produces relatively small amounts of water that condenses or freezes on the interior walls of the vacuum chamber 102.

Example 2—Candy Process 2

In this example, the freeze dryer 100 is also used to dry candy, confections, or other materials having low water content (no more than 20 wt % water content). The process is similar in many ways to the candy process described in Example 1.

Figure 29:
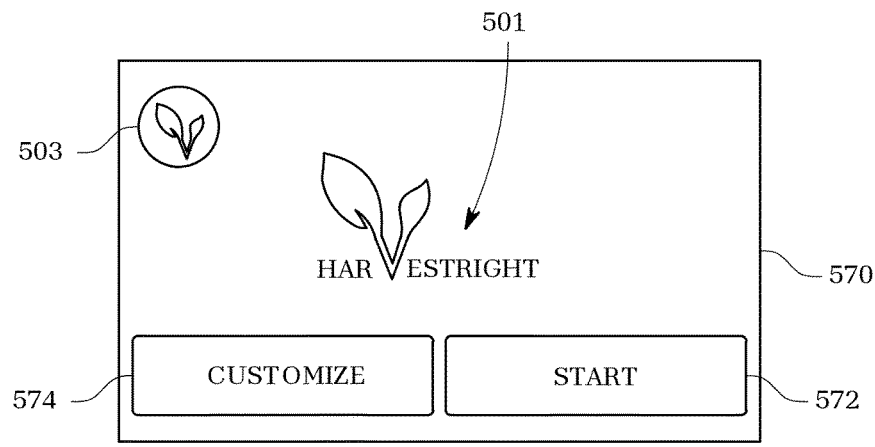
FIG. 29 is an illustration of another embodiment of a screen shown on the display device of a freeze dryer at startup.

The freeze dryer 100 is powered on and the display device 113 displays a start screen 570 as shown in FIG. 29. The start screen 570 includes the Harvest Right name 501, a circle leaf logo 503 in the upper left corner, a start button 572, and a customize button 574. Pressing the start button 572 causes the freeze dryer 100 to begin a typical freeze-drying process.

Figure 30:
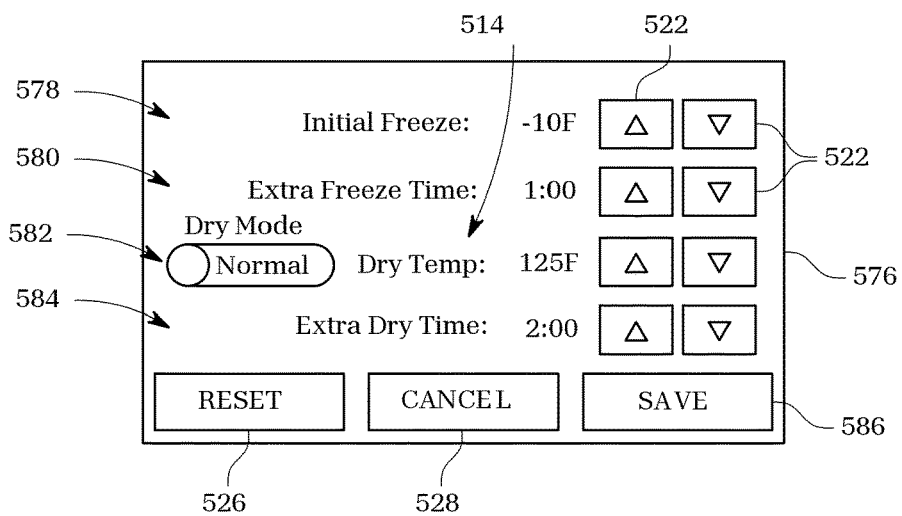
FIG. 30 is an illustration of one embodiment of a screen shown on the display device of the freeze dryer after the user presses "Customize" on the screen shown in FIG. 29. The screen shows settings the user can customize for a drying process.

The user presses the customize button 574. The display device 113 displays a screen 576 as shown in FIG. 30. The screen 576 shows the settings that can be customized for a freeze-drying process. The settings include an initial freeze temperature 578, an extra freeze time 580, a dry mode 582, an extra dry time 584, and the dry temperature 514. The settings can be adjusted using the up and down buttons 522. The screen 576 also includes the reset button 526, the cancel button 528, and a save button 586. The reset button 526 and the cancel button 528 work the same as described in Example 1. The save button 586 is used to save the settings when the user is done adjusting them.

Figure 31:
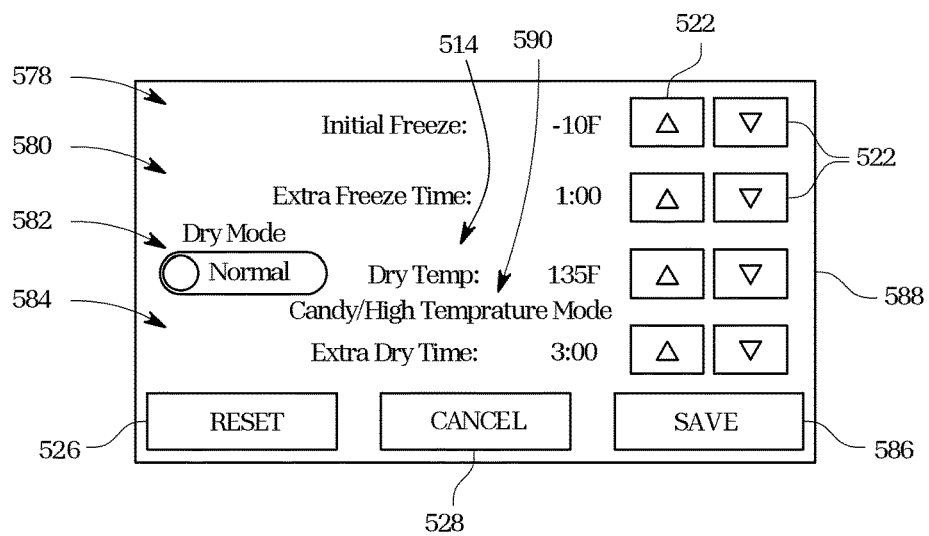
FIG. 31 is an illustration of one embodiment of a screen shown on the display device of the freeze dryer when the user increases the dry temperature on the screen shown in FIG. 30 above a set point. The screen shows that the freeze dryer is in candy/high temperature mode.
Figure 32:
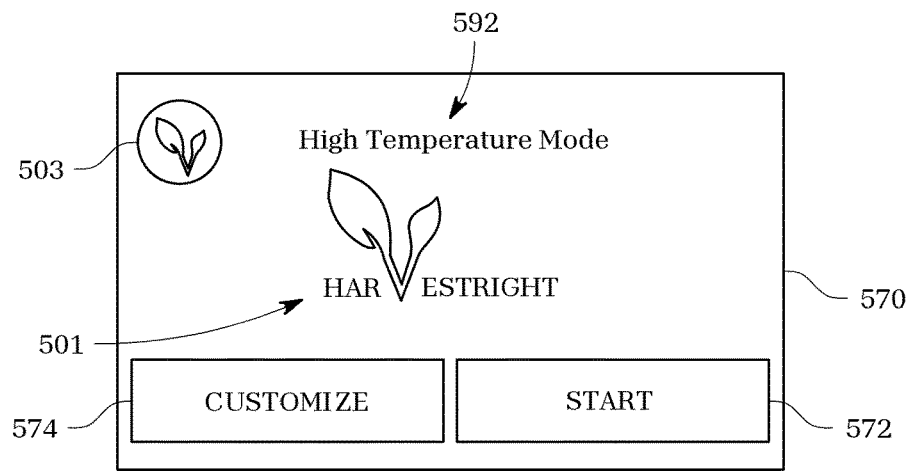
FIG. 32 is an illustration of one embodiment of a screen shown on the display device of the freeze dryer after the user presses "Save" on the screen shown in FIG. 31. The screen shows the startup screen with a message that the freeze dryer is in high temperature mode.

The user increases the dry temperature 514 to 135° F. or above and the display device 113 is updated to display a screen 588 that is the same as screen 576 except it includes a message 590 that the freeze dryer 100 is in "Candy/High Temperature Mode" as shown in FIG. 31. The user presses the save button 586. The display device 113 displays the start screen 570 with a notice 592 at the top that the freeze dryer 100 is in high temperature mode as shown in FIG. 32.

Figure 33:
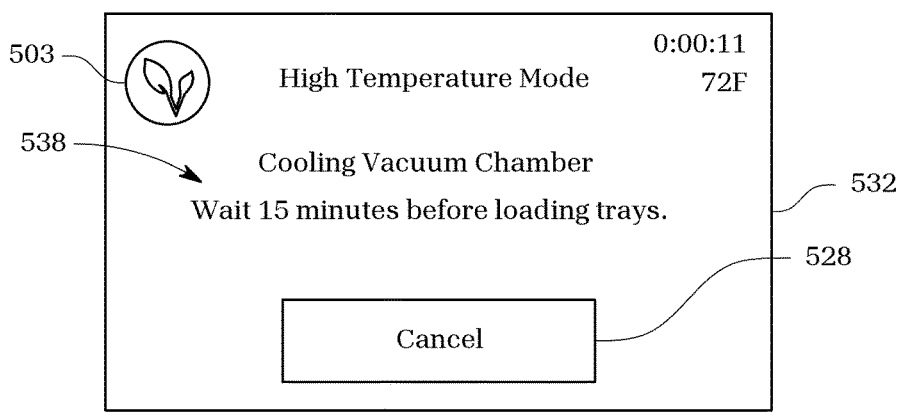
FIG. 33 is an illustration of one embodiment of a screen shown on the display device of the freeze dryer after the user presses "Start" on the screen shown in FIG. 32. The screen shows a message informing the user that the vacuum chamber is cooling.

The user presses the start button 572 on the start screen 570 to begin a freeze-drying process in high temperature mode. The display device 113 displays the screen 532 as shown in FIG. 33, which is the same as FIG. 23 except the "Candy Process" notice at the top of the screen is replaced by "High Temperature Process." the vacuum chamber 102 is cooled in the manner described above in connection with FIG. 23.

Figure 34:
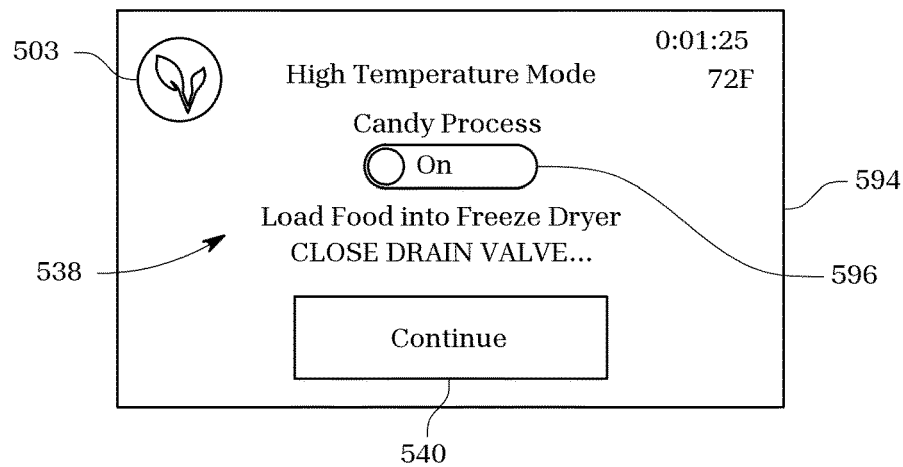
FIG. 34 is an illustration of one embodiment of a screen shown on the display device of the freeze dryer when the interior of the freeze dryer is sufficiently cool to load the trays. The screen shows a message instructing the user to load the trays in the freeze dryer and close the drain valve.

When the vacuum chamber 102 is sufficiently cold, the display device 113 displays a screen 594 as shown in FIG. 34. The screen 594 includes the message 538 to load the trays 180 into the freeze dryer 100 and close the drain valve. The screen 594 also includes the continue button 540 and a candy process setting 596.

The candy process setting 596 is used to distinguish between a freeze-drying process operated in high temperature mode and the candy process. The difference between the two is that the high temperature mode is a typical freeze-drying process, which includes freezing the material and drying it until the electronic controller 101 determines it is done. In contrast, the candy process skips the step of freezing the material, is performed for a set amount of time, and optionally allows the material to be heated before drying it in vacuum conditions.

When the candy process setting 596 is set to "On," the dry time is the extra dry time 584 shown on FIGS. 30 and 31. Referring to FIGS. 30 and 31, it should be noted that the user also increased the extra dry time 584 to 3 hrs from the default of 2 hrs.

Figure 35:
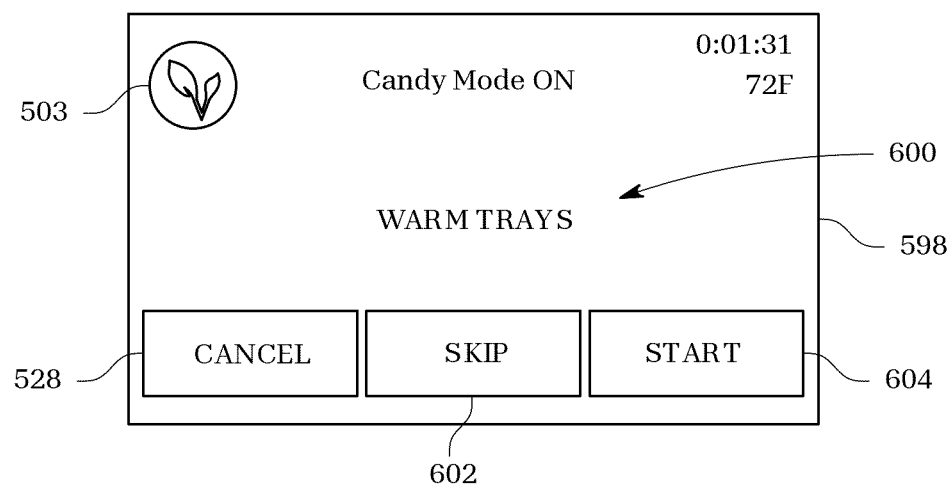
FIG. 35 is an illustration of one embodiment of a screen shown on the display device of the freeze dryer after the user presses "Continue" on the screen shown in FIG. 34. The screen shows a message informing the user that the trays in the freeze dryer are warming.

The user sets the candy process setting 596 to "On" and presses the continue button 540. The display device 113 displays a screen 598 as shown in FIG. 35. The screen 598 includes a prompt 600 asking whether to warm the trays 180 as part of the candy process. The screen 598 also includes the cancel button 528, a skip button 602, and a start button 604. Pressing the skip button 602 skips the step of warming the trays 180 but otherwise continues the candy process. Pressing the start button 604 starts the step of warming the trays 180 followed by the remainder of the candy process.

The user presses the skip button 602 or the start button 604 depending on whether the user wants to warm the trays 180 before drying the material in vacuum conditions. The rest of the candy process is the same as described in Example 1. The freeze dryer 100 operates the same and the display device 113 displays the same screens 542, 546, 552, 558 for the rest of the candy process as described in Example 1. The only difference being that the screens 542, 546, 552 in Example 1 are labeled "Candy Process" and the screens 542, 546, 552 in this example are labeled "Candy Mode ON."

Illustrative Embodiments

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; and memory communicatively linked to the processor, the memory storing instructions used by the processor to operate the freeze dryer; wherein the instructions comprise a drying process including drying the material by reducing the pressure in the vacuum chamber below ambient pressure without freezing the material before reducing the pressure.

P2. The freeze dryer of P1 wherein the drying process includes cooling the one or more interior walls of the vacuum chamber before providing a prompt to position the material in the freeze dryer.

P3. The freeze dryer of P2 wherein the electronic controller includes a display device communicatively linked to the processor, and wherein the prompt includes a message displayed on the display device to position the material in the freeze dryer.

P4. The freeze dryer of P1 wherein the drying process includes heating the material before reducing the pressure below ambient pressure.

P5. The freeze dryer of P4 wherein the drying process includes heating the material to at least 100° F. before reducing the pressure in the vacuum chamber below ambient pressure.

P6. The freeze dryer of P4 wherein the drying process includes heating the material for a set amount of time before reducing the pressure in the vacuum chamber below ambient pressure.

P7. The freeze dryer of P1 wherein the drying process includes collecting water vapor from the material as ice on the one or more interior walls of the vacuum chamber, and wherein the instructions include an option to repeat the drying process with another material without defrosting the ice on the one or more interior walls of the vacuum chamber.

P8. The freeze dryer of P7 wherein the electronic controller comprises a display device communicatively linked to the processor, and wherein the drying process includes displaying on the display device the option to repeat the drying process with another material without defrosting the ice on the one or more interior walls of the vacuum chamber.

P9. The freeze dryer of P1 wherein the drying process includes drying the material by reducing the pressure in the vacuum chamber to no more than 5000 mTorr.

P10. The freeze dryer of P1 wherein the drying process includes drying the material in the vacuum chamber below ambient pressure for a set amount of time.

P11. The freeze dryer of P1 wherein the drying process includes heating the material to at least 100° F. with the heating system while the pressure in the vacuum chamber is below ambient pressure.

P12. The freeze dryer of P1 wherein the instructions include a freeze-drying process.

P13. The freeze dryer of P1 wherein the freeze dryer is structured to collect water vapor from the material on the one or more interior walls of the vacuum chamber.

P14. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; memory communicatively linked to the processor; and a display device communicatively linked to the processor; wherein the electronic controller is configured to: display an option on the display device to operate the freeze dryer without freezing the material before reducing the pressure in the vacuum chamber; receive input selecting the option to operate the freeze dryer without freezing the material before reducing the pressure in the vacuum chamber; and dry the material by reducing the pressure in the vacuum chamber below ambient pressure without freezing the material before reducing the pressure.

P15. The freeze dryer of P14 wherein the option displayed on the display device is identified as being associated with processing candy.

P16. The freeze dryer of P14 wherein the electronic controller is configured to display a message on the display device to position the material in the freeze dryer, and wherein the electronic controller is configured to cool the one or more interior walls of the vacuum chamber before displaying the message.

P17. The freeze dryer of P14 wherein the electronic controller is configured to heat the material before reducing the pressure below ambient pressure.

P18. The freeze dryer of P17 wherein the electronic controller is configured to heat the material to at least 100° F. before reducing the pressure in the vacuum chamber below ambient pressure.

P19. The freeze dryer of P17 wherein the electronic controller is configured to heat the material for a set amount of time before reducing the pressure in the vacuum chamber below ambient pressure.

P20. The freeze dryer of P14 wherein the material is a first batch of material, and wherein the electronic controller is configured to: collect water vapor from the first batch of material as ice on the one or more interior walls of the vacuum chamber; dry a second batch of material by reducing the pressure in the vacuum chamber below ambient pressure without defrosting the ice on the one or more interior walls of the vacuum chamber.

P21. The freeze dryer of P20 wherein the electronic controller is configured to display on the display device an option to dry the second batch of material without defrosting the ice on the one or more interior walls of the vacuum chamber.

P22. The freeze dryer of P14 wherein the electronic controller is configured to dry the material by reducing the pressure in the vacuum chamber to no more than 5000 mTorr.

P23. The freeze dryer of P14 wherein the electronic controller is configured to dry the material in the vacuum chamber below ambient pressure for a set amount of time.

P24. The freeze dryer of P14 wherein the electronic controller is configured to dry the material by heating the material to at least 100° F. with the heating system while the pressure in the vacuum chamber is below ambient pressure.

P25. The freeze dryer of P14 wherein the memory stores instructions used by the processor to operate the freeze dryer, and wherein the instructions include a freeze-drying process.

P26. The freeze dryer of P14 wherein the freeze dryer is structured to collect water vapor from the material on the one or more interior walls of the vacuum chamber.

P27. A method for drying material in a freeze dryer, the freeze dryer comprising: a vacuum chamber including one or more interior walls; a vacuum pump pneumatically linked to the vacuum chamber; a cooling system configured to cool the one or more interior walls of the vacuum chamber; a heating system configured to heat the material in the vacuum chamber; and an electronic controller comprising: a processor; and memory communicatively linked to the processor; the method comprising: positioning the material in the freeze dryer; and drying the material by reducing the pressure in the vacuum chamber below ambient pressure without freezing the material before reducing the pressure.

P28. The method of P27 comprising cooling the one or more interior walls of the vacuum chamber before positioning the material into the freeze dryer.

P29. The method of P27 wherein the electronic controller comprises a display device communicatively linked to the processor, the method comprising displaying a prompt on the display device to position the material in the freeze dryer.

P30. The method of P27 wherein the material includes no more than 20 wt % water.

P31. The method of P27 wherein the material includes no more than 15 wt % water.

P32. The method of P27 wherein the material includes at least 20 wt % sugar.

P33. The method of P27 comprising heating the material before reducing the pressure below ambient pressure.

P34. The method of P33 comprising heating the material to at least 100° F. before reducing the pressure in the vacuum chamber below ambient pressure.

P35. The method of P33 comprising heating the material for a set amount of time before reducing the pressure in the vacuum chamber below ambient pressure.

P36. The method of P27 wherein the material is a first material, the method comprising: collecting water vapor from the material as ice on the one or more interior walls of the vacuum chamber; and drying a second material in the freeze dryer by reducing the pressure in the vacuum chamber below ambient pressure without defrosting the ice on the one or more interior walls of the vacuum chamber.

P37. The method of P36 wherein the electronic controller comprises a display device communicatively linked to the processor, and wherein the method comprises displaying an option on the display device to dry the second material without defrosting the ice on the one or more interior walls of the vacuum chamber.

P38. The method of P27 wherein drying the material includes reducing the pressure in the vacuum chamber to no more than 5000 mTorr.

P39. The method of P27 wherein drying the material includes drying the material in the vacuum chamber below ambient pressure for a set amount of time.

P40. The method of P27 wherein drying the material includes heating the material to at least 100° F. with the heating system while the pressure in the vacuum chamber is below ambient pressure.

P41. The method of P27 wherein the memory stores instructions used by the processor to operate the freeze dryer, and wherein the instructions include a freeze-drying process.

P42. The method of P27 comprising collecting water vapor from the material on the one or more interior walls of the vacuum chamber.

P43. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; and memory communicatively linked to the processor, the memory storing instructions used by the processor to operate the freeze dryer; wherein the instructions comprise a drying process including drying the material by reducing the pressure in the vacuum chamber below ambient pressure and heating the material before reducing the pressure.

P44. The freeze dryer of P43 wherein the drying process includes heating the material to at least 100° F. before reducing the pressure in the vacuum chamber below ambient pressure.

P45. The freeze dryer of P43 wherein the drying process includes heating the material for a set amount of time before reducing the pressure in the vacuum chamber below ambient pressure.

P46. The freeze dryer of P43 wherein the drying process includes drying the material by reducing the pressure in the vacuum chamber below ambient pressure without freezing the material before reducing the pressure.

P47. The freeze dryer of P46 wherein the drying process includes cooling the one or more interior walls of the vacuum chamber before providing a prompt to position the material in the freeze dryer.

P48. The freeze dryer of P47 wherein the electronic controller includes a display device communicatively linked to the processor, and wherein the prompt includes a message displayed on the display device to position the material in the freeze dryer.

P49. The freeze dryer of P43 wherein the drying process includes collecting water vapor from the material as ice on the one or more interior walls of the vacuum chamber, and wherein the instructions include an option to repeat the drying process with another material without defrosting the ice on the one or more interior walls of the vacuum chamber.

P50. The freeze dryer of P49 wherein the electronic controller comprises a display device communicatively linked to the processor, and wherein the drying process includes displaying on the display device the option to repeat the drying process with another material without defrosting the ice on the one or more interior walls of the vacuum chamber.

P51. The freeze dryer of P43 wherein the drying process includes drying the material by reducing the pressure in the vacuum chamber to no more than 5000 mTorr.

P52. The freeze dryer of P43 wherein the drying process includes drying the material in the vacuum chamber below ambient pressure for a set amount of time.

P53. The freeze dryer of P43 wherein the drying process includes heating the material to at least 100° F. with the heating system while the pressure in the vacuum chamber is below ambient pressure.

P54. The freeze dryer of P43 wherein the instructions include a freeze-drying process.

P55. The freeze dryer of P43 wherein the freeze dryer is structured to collect water vapor from the material on the one or more interior walls of the vacuum chamber.

P56. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; memory communicatively linked to the processor; and a display device communicatively linked to the processor; wherein the electronic controller is configured to: display an option on the display device to heat the material before drying the material by reducing the pressure in the vacuum chamber below ambient pressure; receive input selecting the option to heat the material before drying the material by reducing the pressure in the vacuum chamber below ambient pressure; and heat the material and subsequently dry the material by reducing the pressure in the vacuum chamber below ambient pressure.

P57. The freeze dryer of P56 wherein the electronic controller is configured to heat the material to at least 100° F. before reducing the pressure in the vacuum chamber below ambient pressure.

P58. The freeze dryer of P56 wherein the electronic controller is configured to heat the material for a set amount of time before reducing the pressure in the vacuum chamber below ambient pressure.

P59. The freeze dryer of P56 wherein the electronic controller is configured to dry the material by reducing the pressure in the vacuum chamber below ambient pressure without freezing the material before reducing the pressure.

P60. The freeze dryer of P56 wherein the electronic controller is configured to cool the one or more interior walls of the vacuum chamber before providing a prompt to position the material in the freeze dryer.

P61. The freeze dryer of P60 wherein the prompt includes a message displayed on the display device to position the material in the freeze dryer.

P62. The freeze dryer of P56 wherein the material is a first batch of material, and wherein the electronic controller is configured to: collect water vapor from the first batch of material as ice on the one or more interior walls of the vacuum chamber; dry a second batch of material by reducing the pressure in the vacuum chamber below ambient pressure without defrosting the ice on the one or more interior walls of the vacuum chamber.

P63. The freeze dryer of P62 wherein the electronic controller is configured to display on the display device an option to dry the second batch of material without defrosting the ice on the one or more interior walls of the vacuum chamber.

P64. The freeze dryer of P56 wherein the electronic controller is configured to dry the material by reducing the pressure in the vacuum chamber to no more than 5000 mTorr.

P65. The freeze dryer of P56 wherein the electronic controller is configured to dry the material in the vacuum chamber below ambient pressure for a set amount of time.

P66. The freeze dryer of P56 wherein the electronic controller is configured to dry the material by heating the material to at least 100° F. with the heating system while the pressure in the vacuum chamber is below ambient pressure.

P67. The freeze dryer of P56 wherein the memory stores instructions used by the processor to operate the freeze dryer, and wherein the instructions include a freeze-drying process.

P68. The freeze dryer of P56 wherein the freeze dryer is structured to collect water vapor from the material on the one or more interior walls of the vacuum chamber.

P69. A method for drying material in a freeze dryer, the freeze dryer comprising: a vacuum chamber including one or more interior walls; a vacuum pump pneumatically linked to the vacuum chamber; a cooling system configured to cool the one or more interior walls of the vacuum chamber; a heating system configured to heat the material in the vacuum chamber; and an electronic controller comprising: a processor; and memory communicatively linked to the processor; the method comprising: positioning the material in the freeze dryer; heating the material in the freeze dryer before reducing the pressure in the vacuum chamber below ambient pressure; and drying the material by reducing the pressure in the vacuum chamber below ambient pressure.

P70. The method of P69 comprising heating the material to at least 100° F. before reducing the pressure in the vacuum chamber below ambient pressure.

P71. The method of P69 comprising heating the material for a set amount of time before reducing the pressure in the vacuum chamber below ambient pressure.

P72. The method of P69 wherein the material includes no more than 20 wt % water.

P73. The method of P69 wherein the material includes no more than 15 wt % water.

P74. The method of P69 wherein the material includes at least 20 wt % sugar.

P75. The method of P69 wherein the method includes drying the material by reducing the pressure in the vacuum chamber below ambient pressure without freezing the material before reducing the pressure.

P76. The method of P75 wherein the method includes cooling the one or more interior walls of the vacuum chamber before providing a prompt to position the material in the freeze dryer.

P77. The method of P76 wherein the electronic controller includes a display device communicatively linked to the processor, the method comprising displaying a message on the display device to position the material in the freeze dryer.

P78. The method of P69 wherein the material is a first material, the method comprising: collecting water vapor from the material as ice on the one or more interior walls of the vacuum chamber; and drying a second material in the freeze dryer by reducing the pressure in the vacuum chamber below ambient pressure without defrosting the ice on the one or more interior walls of the vacuum chamber.

P79. The method of P78 wherein the electronic controller comprises a display device communicatively linked to the processor, and wherein the method comprises displaying an option on the display device to dry the second material without defrosting the ice on the one or more interior walls of the vacuum chamber.

P80. The method of P69 wherein drying the material includes reducing the pressure in the vacuum chamber to no more than 5000 mTorr.

P81. The method of P69 wherein drying the material includes drying the material in the vacuum chamber below ambient pressure for a set amount of time.

P82. The method of P69 wherein drying the material includes heating the material to at least 100° F. with the heating system while the pressure in the vacuum chamber is below ambient pressure.

P83. The method of P69 wherein the memory stores instructions used by the processor to operate the freeze dryer, and wherein the instructions include a freeze-drying process.

P84. The method of P69 comprising collecting water vapor from the material on the one or more interior walls of the vacuum chamber.

P85. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; and memory communicatively linked to the processor, the memory storing instructions used by the processor to operate the freeze dryer; wherein the instructions comprise a drying process including drying the material by reducing the pressure in the vacuum chamber below ambient pressure and collecting water vapor from the material as ice on the one or more interior walls of the vacuum chamber; and wherein the instructions include an option to repeat the drying process with another material without defrosting the ice on the one or more interior walls of the vacuum chamber.

P86. The freeze dryer of P85 wherein the electronic controller includes a display device communicatively linked to the processor and the drying process includes displaying the option to repeat the drying process with another material without defrosting the ice on the one or more interior walls of the vacuum chamber.

P87. The freeze dryer of P85 wherein the drying process includes drying the material by reducing the pressure in the vacuum chamber below ambient pressure without freezing the material before reducing the pressure.

P88. The freeze dryer of P87 wherein the drying process includes cooling the one or more interior walls of the vacuum chamber before providing a prompt to position the material in the freeze dryer.

P89. The freeze dryer of P88 wherein the electronic controller includes a display device communicatively linked to the processor, and wherein the prompt includes a message displayed on the display device to position the material in the freeze dryer.

P90. The freeze dryer of P85 wherein the drying process includes heating the material before reducing the pressure below ambient pressure.

P91. The freeze dryer of P90 wherein the drying process includes heating the material to at least 100° F. before reducing the pressure in the vacuum chamber below ambient pressure.

P92. The freeze dryer of P90 wherein the drying process includes heating the material for a set amount of time before reducing the pressure in the vacuum chamber below ambient pressure.

P93. The freeze dryer of P85 wherein the drying process includes drying the material by reducing the pressure in the vacuum chamber to no more than 5000 mTorr.

P94. The freeze dryer of P85 wherein the drying process includes drying the material in the vacuum chamber below ambient pressure for a set amount of time.

P95. The freeze dryer of P85 wherein the drying process includes heating the material to at least 100° F. with the heating system while the pressure in the vacuum chamber is below ambient pressure.

P96. The freeze dryer of P85 wherein the instructions include a freeze-drying process.

P97. A freeze dryer comprising: a vacuum chamber including one or more interior walls; a vacuum pump pneumatically linked to the vacuum chamber; a cooling system configured to cool the one or more interior walls of the vacuum chamber; a heating system configured to heat material in the vacuum chamber; and an electronic controller comprising: a processor; memory communicatively linked to the processor; and a display device communicatively linked to the processor; wherein the electronic controller is configured to: dry the material by reducing the pressure in the vacuum chamber below ambient pressure, wherein water vapor removed from the material collects as ice on the one or more interior walls of the vacuum chamber; display an option on the display device to repeat the drying process with another material without defrosting the ice on the one or more interior walls of the vacuum chamber.

P98. The freeze dryer of P97 wherein the electronic controller is configured to dry the material by reducing the pressure in the vacuum chamber below ambient pressure without freezing the material before reducing the pressure.

P99. The freeze dryer of P97 wherein the electronic controller is configured to cool the one or more interior walls of the vacuum chamber before providing a prompt to position the material in the freeze dryer.

P100. The freeze dryer of P99 wherein the prompt includes a message displayed on the display device to position the material in the freeze dryer.

P101. The freeze dryer of P97 wherein the electronic controller is configured to heat the material before reducing the pressure below ambient pressure.

P102. The freeze dryer of P101 wherein the electronic controller is configured to heat the material to at least 100° F. before reducing the pressure in the vacuum chamber below ambient pressure.

P103. The freeze dryer of P101 wherein the electronic controller is configured to heat the material for a set amount of time before reducing the pressure in the vacuum chamber below ambient pressure.

P104. The freeze dryer of P97 wherein the electronic controller is configured to dry the material by reducing the pressure in the vacuum chamber to no more than 5000 mTorr.

P105. The freeze dryer of P97 wherein the electronic controller is configured to dry the material in the vacuum chamber below ambient pressure for a set amount of time.

P106. The freeze dryer of P97 wherein the electronic controller is configured to dry the material by heating the material to at least 100° F. with the heating system while the pressure in the vacuum chamber is below ambient pressure.

P107. The freeze dryer of P97 wherein the memory stores instructions used by the processor to operate the freeze dryer, and wherein the instructions include a freeze-drying process.

P108. A method for drying a first material and a second material in a freeze dryer, the freeze dryer comprising: a vacuum chamber including one or more interior walls; a vacuum pump pneumatically linked to the vacuum chamber; a cooling system configured to cool the one or more interior walls of the vacuum chamber; a heating system configured to heat the first material and the second material in the vacuum chamber; and an electronic controller comprising: a processor; and memory communicatively linked to the processor; the method comprising: positioning the first material in the freeze dryer; drying the first material by reducing the pressure in the vacuum chamber below ambient pressure; collecting water vapor from the first material as ice on the one or more interior walls of the vacuum chamber; removing the first material in the freeze dryer; positioning the second material in the freeze dryer; drying the second material in the freeze dryer by reducing the pressure in the vacuum chamber below ambient pressure without defrosting the ice on the one or more interior walls of the vacuum chamber.

P109. The method of P108 wherein the electronic controller comprises a display device communicatively linked to the processor and the method comprises displaying an option on the display device to dry the second material without defrosting the ice on the one or more interior walls of the vacuum chamber.

P110. The method of P108 wherein the first material includes no more than 20 wt % water.

P111. The method of P108 wherein the first material includes no more than 15 wt % water.

P112. The method of P108 wherein the first material includes at least 20 wt % sugar.

P113. The method of P108 wherein the method includes drying the first material by reducing the pressure in the vacuum chamber below ambient pressure without freezing the first material before reducing the pressure.

P114. The method of P113 wherein the method includes cooling the one or more interior walls of the vacuum chamber before providing a prompt to position the first material in the freeze dryer.

P115. The method of P114 wherein the electronic controller includes a display device communicatively linked to the processor, the method comprising displaying a message on the display device to position the first material in the freeze dryer.

P116. The method of P108 comprising heating the first material before reducing the pressure below ambient pressure.

P117. The method of P116 comprising heating the first material to at least 100° F. before reducing the pressure in the vacuum chamber below ambient pressure.

P118. The method of P116 comprising heating the first material for a set amount of time before reducing the pressure in the vacuum chamber below ambient pressure.

P119. The method of P108 wherein drying the first material includes reducing the pressure in the vacuum chamber to no more than 5000 mTorr.

P120. The method of P108 wherein drying the first material includes drying the first material in the vacuum chamber below ambient pressure for a set amount of time.

P121. The method of P108 wherein drying the first material includes heating the first material to at least 100° F. with the heating system while the pressure in the vacuum chamber is below ambient pressure.

P122. The method of P108 wherein the memory stores instructions used by the processor to operate the freeze dryer, and wherein the instructions include a freeze-drying process.

Electronic Controller

Figure 36:
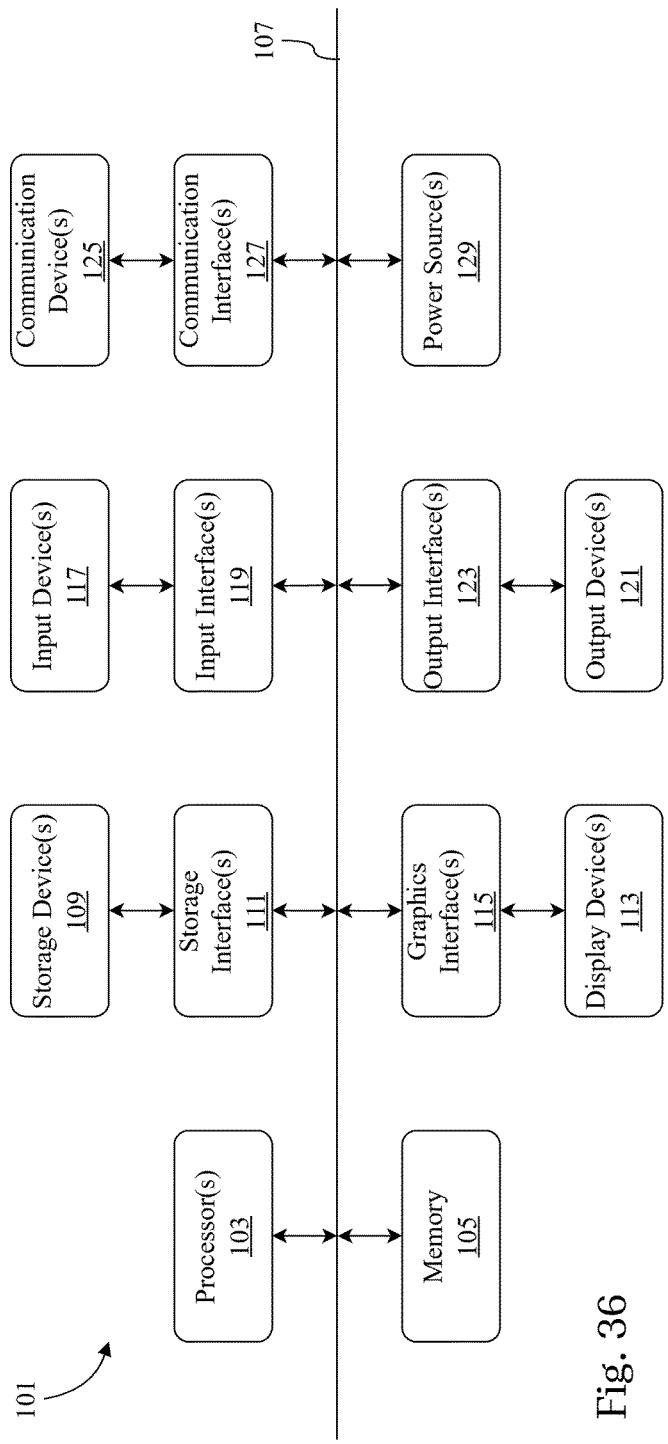
FIG. 36 shows one embodiment of an electronic controller that can used as part of the freeze dryer.
Figure 37:
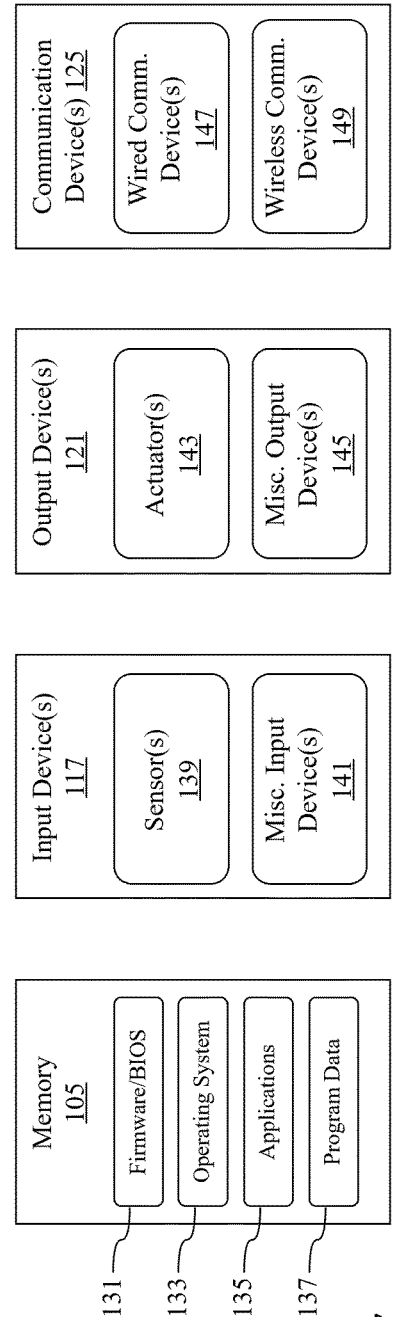
FIG. 37 shows various embodiments of the devices that can be included as part of the electronic controller in FIG. 36.

FIG. 36 shows one embodiment of an electronic controller 101 (alternatively referred to as an electronic computing device, programmable logic controller, electronic control system, or electronic computing system) that can used as part of the freeze dryer. FIG. 37 shows embodiments of the devices that can be included as part of the electronic controller 101.

The electronic controller 101 includes one or more processors 103 (alternatively referred to as a digital processing unit or microprocessor) and memory 105 communicatively linked to each other by way of a system bus 107. In some embodiments, the electronic controller 101 can also include one or more other interfaces and/or devices communicatively linked to the system bus 107.

For example, one or more storage devices 109 can be communicatively linked to the system bus 107 by way of one or more storage interfaces 111. One or more display devices 113 can be communicatively linked to the system bus 107 by way of one or more graphics interfaces 115. One or more input devices 117 can be communicatively linked to the system bus 107 by way of one or more input interfaces 119. One or more output devices 121 can be communicatively linked to the system bus 107 by way of one or more output interfaces 123. One or more communication devices 125 can be communicatively linked to the system bus 107 by way of one or more communication interfaces 127.

It should be appreciated that the electronic controller 101 can have a variety of configurations. For example, in some embodiments, the various components of the electronic controller 101 can be positioned near each other in one or more housings and on a single circuit board or multiple circuit boards communicatively linked together, or the like. In other embodiments, the various components of the electronic controller 101 can be located remotely. For example, the one or more input devices 117 and/or the one or more output devices 121 can be located remotely or at a distance from the one or more processors 103 and/or the memory 105.

Processor

Each of the one or more processors 103 is an electric circuit such as an integrated circuit that executes program instructions. The processor 103 can perform operations such as arithmetic operations, logic operations, controlling operations, and input/output (I/O) operations specified by the program instructions. In some embodiments, the processor 103 includes a control unit (CU), an arithmetic logic unit (ALU), and/or a memory unit (alternatively referred to as cache memory).

The control unit can direct the operation of the processor 103 and/or instruct the memory 105, arithmetic logic unit, and output devices 121 how to respond to instructions in the program. It can also direct the flow of data or information between the processor 103 and other components of the electronic controller 101. It can also control the operation of other components by providing timing and control signals.

The arithmetic logic unit is an electric circuit in the processor 103 that performs integer arithmetic and bitwise logic operations. The arithmetic logic unit receives input in the form of data or information to be operated on and code describing the operation to be performed. The arithmetic logic unit provides the result of the performed operation as output. In some configurations, the arithmetic logic unit can also include status inputs and/or outputs that convey information about a previous operation or the current operation between the arithmetic logic unit and external status registers.

It should be appreciated that the processor 103 can have any suitable configuration. For example, the processor 103 can range from a simple processor specially built or configured to execute one or more programs for a specific application or device to a complex central processing unit configured to be used in a wide variety of ways and an equally wide variety of applications. Examples of processors 103 include a general-purpose processor, a digital signal processor (DSP), an application specific integrated circuit (ASIC), a central processing unit (CPU), a field programmable gate array (FPGA) or other programmable logic device (PLD), and/or discrete gate or transistor logic. The processor 103 can also be implemented as any one or combination of these devices.

Memory

The memory 105 (alternatively referred to as primary memory, main memory, or a computer-readable medium) is a semiconductor device or system used to store information for immediate use by the processor 103. The memory 105 is generally directly accessible to the processor 103. The processor 103 can read and execute program instructions stored in the memory 105 as well as store data and/or other information in the memory 105 that is actively being operated on. The memory 105 is generally more expensive and operates at higher speeds compared to the storage device 109. The memory 105 can be volatile such as random-access memory (RAM) or non-volatile such as read-only memory (ROM).

System Bus

The system bus 107 broadly refers to the communication system through which information is transferred between the processor 103, the memory 105, and/or other components such as peripherals that can be considered part of the electronic controller 101. The system bus 107 can include a physical system of connectors, conductive pathways, optical pathways, wires, or the like through which information travels.

The system bus 107 can have a variety of physical configurations. In some embodiments, the system bus can be configured as a backbone connecting the processor 103, the memory 105, and/or the various devices and/or interfaces as shown in the figure. In other embodiments, the system bus 107 can be configured as separate buses that communicatively link one or more components together. For example, the system bus 107 can include a bus communicatively linking the processor 103, the memory 105, and/or circuit board (the bus can alternatively be referred to as the frontside bus, memory bus, local bus, or host bus). The system bus 107 can include multiple additional I/O buses communicatively linking the various other devices and/or interfaces to the processor 103.

It should be appreciated that information shared between the components of the electronic controller 101 can include program instructions, data, signals such as control signals, commands, bits, symbols, or the like. The information can be represented using a variety of different technologies and techniques. For example, in some embodiments, the information can be represented by voltages, currents, electromagnetic waves, magnetic fields or particles, optical fields, or the like.

The system bus 107 can also be used for other purposes besides sharing information. For example, the system bus 107 can be used to supply power from the power source 129 to the various devices and/or interfaces connected to the system bus 107. Likewise, the system bus 107 can include address lines which match those of the processor 103. This allows information to be sent to or from specific memory locations in the memory 105. The system bus 107 can also provide a system clock signal to synchronize the various devices and/or interfaces with the rest of the system.

The system bus 107 can use a variety of architectures, communication protocols, or protocol suites to communicatively link the processor 103, the memory 105, and/or any of the other devices and/or interfaces. For example, suitable architectures include Industry Standard Architecture (ISA), Extended Industry Standard Architecture (EISA), Micro Channel Architecture (MCA), Video Electronics Standards Association (VESA), Peripheral Component Interconnect (PCI), PCI Express (PCI-X), Personal Computer Memory Card Industry Association (PCMCIA or PC bus), Accelerated Graphics Port (AGP), Small Computer Systems Interface (SCSI), and the like. Suitable communication protocols include TCP/IP, IPX/SPX, Modbus, DNP, BACnet, ControlNet, Ethernet/IP, or the like.

Program Instructions

The instructions stored in the electronic controller 101 can include software algorithms and/or application programs. It should be appreciated that the software algorithms can be expressed in the form of methods or processes performed in part or entirely by the electronic controller 101 or as instructions stored in a computer-readable medium such as the memory 105 and/or the storage device 109. Likewise, the software algorithms are shown in the flowcharts and described in the methods and/or processes.

It should be appreciated that instructions can take the form of entirely software (including firmware, resident software, micro-code, or the like), entirely hardware, or a combination of software and hardware. If implemented in software executed by the processor 103, the information may be stored on or transmitted over a computer-readable medium such as the memory 105 and/or the storage device 109. In some embodiments, the instructions can be contained in any tangible medium of expression having program code embodied in the medium. In some embodiments, the instructions can be written in any combination of one or more programming languages, which can be text-based or graphical languages.

It should also be appreciated that the flowcharts, block diagrams, methods, and/or processes describe algorithms and/or symbolic representations of information operations. The algorithmic descriptions and representations are the means used by those skilled in the data processing arts to convey the substance of their work most effectively to others skilled in the art. These operations, while described functionally or logically, are understood to be implemented by software and/or hardware that can be readily and easily created from the functional or logical descriptions of the algorithms.

For example, the instructions can include an algorithm for making a decision—e.g., determining whether a parameter satisfies one or more conditions and performing various operations based upon the parameter satisfying the one or more conditions. This can be represented in the instructions with a conditional statement or condition expression written in a programming language. An example of such a conditional is shown below. It should be appreciated that the syntax for the conditional will vary depending on the chosen programming language.

```
if condition 1 satisfied then
    perform operation 1
elseif condition2satisfied then
    perform operation 2
elseif condition3satisfied then
    perform operation 3
else
    perform operation 4;
end if;
```

The instructions can be used to perform a variety of operations. For example, the instructions can be used to control the receipt and processing of data from the input devices 117. The instructions can also be used to control hardware such as any of the output devices 121.

In some embodiments, the instructions can include firmware such as a basic input/output system (BIOS) 131, an operating system 133, one or more application programs 135, program data 137, and the like. These can be stored in the memory 105 and/or the storage device 109. In general, the instructions are stored in the memory 105 when the electronic controller 101 is on and running or while the instructions are being used (e.g., an application program is running). Likewise, the instructions are stored in the storage device 109 when the electronic controller 101 is off.

In some embodiments, the instructions are used to control operation of the freeze dryer 100 in any of the ways described above.

Storage Device

Each of the one or more storage devices 109 (alternatively referred to as secondary memory, or a computer-readable medium) is a device or system used to store information that is not needed for immediate use by the processor 103. The storage device 109 can be communicatively linked to the system bus 107 by way of a storage interface 111. The storage device 109 is generally not directly accessible to the processor 103. The storage device 109 is generally less expensive and operates at lower speeds compared to the memory 105. The storage device 109 is also generally non-volatile and used to permanently store the information.

The storage device 109 can take a variety of physical forms and use a variety of storage technologies. For example, in some embodiments, the storage device 109 can be in the form of a hard disk storage device, solid-state storage device, optical storage device, or the like. Also, in some embodiments, the storage device 109 can use technologies such as a magnetic disk (e.g., disk drives), laser beam (e.g., optical drives), semiconductor (e.g., solid-state drives), and/or magnetic tape to store information.

Display Device

Each of the one or more display devices 113 (alternatively referred to as a human-machine interfaces (HMI) or screens) is a device that visually conveys text, graphics, video, and/or other information. In some embodiments, the information shown on the display device 113 exists electronically and is displayed for a temporary period of time. It should be appreciated that the display device 113 can operate as an output device and/or input device (e.g., touchscreen display or the like).

The display device 113 can be communicatively linked to the system bus 107 by way of one or more graphics interfaces 115. In some embodiments, the graphics interface 115 can be used to generate a feed of output images to the display device 113. In some embodiments, the graphics interface 115 can be a separate component such as a dedicated graphics card or chip or can be an integrated component that is part of or a subset of the processor 103.

It should be appreciated that the display device 113 can include a variety of physical structures and/or display technologies. For example, in some embodiments, the display device 113 can be a screen integrated into a specific application or technology, a separate screen such as a monitor, or the like. The display device 113 can also be a liquid crystal display, a light emitting diode display, a plasma display, a quantum dot display, or the like. The display device 113 can also be the display of a mobile computing device such as a mobile phone, tablet, laptop, and the like.

Input Devices

Each of the one or more input devices 117 is a physical component that provides information to the processor 103 and/or the memory 105. The input device 117 can be communicatively linked to the system bus 107 by way of one or more input interfaces 119. The input device 117 can be any suitable type and can provide any of a variety of information. For example, the input device 117 can be a digital and/or analog device and can provide information in a digital or analog format. Also, the input device 117 can be used to provide user input for controlling the electronic controller 101 or operational input for controlling aspects of a specific application.

The input device 117 can include one or more sensors 139 and/or one or more other miscellaneous input devices 141. It should be appreciated that the input device 117 is not limited to only providing information. In some embodiments, the input device 117 can also receive information. Such devices can be considered both an input device 117 and an output device 121.

The miscellaneous input device 141 can include a variety of devices or components. In some embodiments, the miscellaneous input devices 141 can include switches such as limit switches, level switches, vacuum switches, pressure switches, or the like, as well as buttons including pushbuttons or the like. In some embodiments, the miscellaneous input devices 141 include user interface components such as a pointing device, for example a mouse, text input devices, for example a keyboard, a touch screen, or the like.

Sensors

Each of the one or more sensors 139 can be used to provide information about a wide variety of measured parameters. In general terms, the sensor 139 is used to measure or detect information about its environment and send the information to the processor 103 and/or the memory 105. In some embodiments, the sensor 139 can operate as a transducer and generate an electrical signal as a function of the measured parameter. The electrical signal is communicated to the processor 103 and/or the memory 105 where it can be used for a variety of purposes.

The sensor 139 can be a digital sensor and/or an analog sensor. For example, in some embodiments, the sensor 139 provides digital information to the processor 103 and/or the memory 105. In other embodiments, the sensor 139 provides analog information to the processor 103 and/or the memory 105. Also, in some embodiments, the information can be converted from one type to the other—e.g., from digital to analog or from analog to digital.

The sensor 139 can measure the parameter directly (i.e., direct measurement) or indirectly (i.e., indirect measurement). A direct measurement sensor directly measures the parameter itself. An indirect measurement sensor measures a secondary parameter that can be translated into the parameter of interest.

The sensor 139 can communicate information to the processor 103 and/or the memory 105 in a variety of ways and/or using a variety of protocols. In some embodiments, the sensor 139 can be a protocol-based sensor that uses a protocol to communicate with the processor 103 and/or the memory 105, or it can be a nonprotocol-based sensor that does not use a protocol to communicate with the processor 103 and/or the memory 105. A protocol-based sensor communicates with the processor 103 by sending a data stream by way of a communication protocol. In some embodiments, the protocol-based sensor includes a separate processor that is part of the sensor and used to communicate using the protocol.

It should be appreciated that the information provided by the sensor 139 can be used in a variety of ways by the processor 103. For example, in some embodiments, the processor 103 can compare the information to a set point. In some embodiments, analog information is amplified before being compared to the set point.

In some embodiments, the sensor 139 can be used to measure one or more parameters. For example, the sensors 139 can be used to measure temperature, pressure, power draw, power consumption.

Temperature Sensors

In some embodiments, the sensor 139 is a temperature sensor used to measure the temperature of the vacuum chamber 102, shelves 142, inner cylinder 146, trays 180, material being dried, and the like. Temperature is the physical quantity expressing the thermal energy present in matter. In some embodiments, the temperature sensor acts as a transducer and generates an electrical signal as a function of the measured temperature.

The temperature sensor can be a contact type temperature sensor or a non-contact type temperature sensor. Contact type temperature sensors are positioned in physical contact with the material and rely primarily on conduction to detect changes in its temperature. Non-contact type temperature sensors are not positioned in physical contact with the material and rely primarily on convection and/or radiation to detect changes in its temperature.

The temperature sensor can be any of a variety of types of temperature sensors. For example, suitable temperature sensors include thermocouples (type K, J, T, E, N, S, R, or the like), resistance temperature detectors (RTDs), thermistors, bimetallic strips, semiconductor temperature sensors, thermometers, vibrating wire temperature sensors, infrared temperature sensors, or the like.

Pressure Sensors

In some embodiments, the sensor 139 is a pressure sensor used to the pressure of fluids such as air in the vacuum chamber 102. Pressure is an expression of the force required to stop the fluid from expanding and is expressed in force per unit area. In some embodiments, the pressure sensor acts as a transducer and generates an electrical signal as a function of the measured pressure.

The pressure sensor can be configured to measure a variety of pressures. In some embodiments, the pressure sensor is an absolute pressure sensor configured to measure the pressure relative to a vacuum. In some embodiments, the pressure sensor is a gauge pressure sensor configured to measure the pressure relative to ambient atmospheric pressure. In some embodiments, the pressure sensor is a differential pressure sensor configured to measure the difference between two pressures. In some embodiments, the pressure sensor is a sealed pressure sensor configure to measure the pressure relative to some fixed pressure other than ambient atmospheric pressure.

The pressure sensor can use a variety of pressure sensing technologies. In some embodiments, the pressure sensor can use force collecting pressure sensing technology. These types of electronic pressure sensors use a force collector such as a diaphragm, piston, bourdon tube, bellows, or the like, to measure strain or deflection due to applied force over an area. Examples of suitable force collector pressure sensors includes piezoresistive strain gauge pressure sensors, capacitive pressure sensors, electromagnetic pressure sensors, piezoelectric pressure sensors, strain-gauge pressure sensors, optical pressure sensors, potentiometric pressure sensors, force balancing pressure sensors, or the like. In some embodiments, the pressure sensor can use other properties such as density to infer pressure of a fluid.

Output Devices

Each of the one or more output devices 121 is a physical component that receives information from the processor 103 and/or the memory 105. The output device 121 can be communicatively linked to the system bus 107 by way of one or more output interfaces 123. The output device 121 can be any suitable type and can receive any of a variety of information. For example, the output device 121 can be a digital and/or analog device and can receive information in a digital and/or analog format. Also, the output device 121 can be used to provide information to the user or perform various operations related to the specific application.

The output device 121 can include one or more actuators 143 and/or one or more other miscellaneous output devices 145. It should be appreciated that the output device 121 is not limited to only receiving information. In some embodiments, the output device 121 can also send information. Such devices can be considered both an output device 121 and an input device 117.

The miscellaneous output devices 145 can include a variety of devices or components. In some embodiments, the miscellaneous output devices 145 can include audio output devices such as speakers as well as other output devices.

Actuators

Each of the one or more actuators 143 can be used to activate movement or an operation. In general terms, the actuator 143 is used to activate something in response to an instruction or control signal sent from the processor 103. In some embodiments, the actuator 143 can act as a transducer by receiving an electrical signal and transforming it into the desired movement or operation.

The information received by the actuator 143 can take a variety of forms and use a number of technologies. For example, the information may be in the form of an electric voltage or current, pneumatic or hydraulic fluid pressure, binary data, or the like. The information can be provided as digital and/or analog format. For example, in some embodiments, the actuator 143 receives digital information from the processor 103 or other component(s) in the electronic controller 101. In other embodiments, the actuator 143 receives analog information from the processor 103 or other component(s) in the electronic controller 101. Also, in some embodiments, the information received by the actuator 143 can be converted from one type to the other—e.g., from digital to analog or from analog to digital.

The actuator 143 can use a variety of energy sources to operate. For example, the actuator 143 can operate using electrical energy, hydraulic energy, pneumatic energy, thermal energy, magnetic energy, or the like. Likewise, the actuator 143 can be an electric actuator, hydraulic actuator, pneumatic actuator, thermal actuator, magnetic actuator, or the like. The actuator 143 can also be used to produce a variety of movements. For example, the actuator 143 can be used to produce linear movement and/or rotary movement.

Motors

In some embodiments, the actuator 143 can include an electric motor. In general, the electric motor is a device that converts electrical energy to mechanical energy. In some embodiments, the mechanical energy produced by the electric motor is in the form of the rotation of a shaft. The mechanical energy can be used directly or converted into other mechanical movement using levers, gears, ratchets, cams, or the like. The motor can be a DC motor or an AC motor.

Relays

In some embodiments, the actuator 143 can include a relay. In general, a relay is an electrically operated switch. In some embodiments, the relay includes one or more input terminals to receive information or control signals and one or more operating contact terminals electrically linked to a separate electrical device.

In some embodiments, the relays can include electromechanical relays having contacts that mechanically open and close. For example, the relay can include an electromagnet that opens and closes the contacts. In other embodiments, the relays can include solid state relays that use semiconductor properties to control the on or off state of the relay without any moving parts. Solid state relays can include thyristors and transistors to switch currents up to a hundred amps or more.

Communication Devices

Each of the communication devices 125 is a physical component that allows the electronic controller 101 to communicate with other devices, components, and/or networks. The communication device can be communicatively linked to the system bus 107 by way of one or more communication interfaces 127. The communication device 125 can include one or more wired communication devices 147 and/or one or more wireless communication devices 149.

It should be appreciated that the communication device 125 can be any suitable physical device. For example, in some embodiments, the communication device 125 is a network interface controller used to connect the electronic controller 101 to a larger network such as a local area network (LAN), wide area network (WAN), or the Internet.

It should also be appreciated that the communication device 125 can use a variety of communication protocols. For example, in some embodiments, the wired communication device 147 can use communication protocols such as Ethernet, RS-232, RS-485, USB, or the like. Also, in some embodiments, the wireless communication devices 149 can use communication protocols such as Wi-Fi, Bluetooth, Zigbee, LTE, 5G, or the like.

Power Source

The power source 129 can be used to supply electric power to the electronic controller 101. The power source 129 can provide any suitable type of power including AC power, DC power, or the like. The power source 129 can obtain power from any suitable source including an AC power source (standard wall outlet), DC power source (a transformer plugged into a wall outlet), battery, generator, or the like.

In some embodiments, the power source 129 includes a power supply that converts electric current from a source to a desired voltage, current, and/or frequency to power the electronic controller 101. In some embodiments, the power supply can convert AC power ranging from 110-240 VAC to DC power ranging from 6-60 VDC.

Circuit Board

The electronic controller 101 can include one or more circuit boards (alternatively referred to as logic boards) to which one or more of the components can be coupled. For example, the processor 103, the memory 105, the storage device 109, the display device 113, the input device 117, the output device 121, the communication device 125, and/or the power source 129 can be coupled to one or more circuit boards. In some embodiments, the processor 103, the memory 105, and/or the storage device 109 can be coupled to one circuit board.

In some embodiments, the circuit board can contain a series of conductive tracks, pads, and/or other features etched from one or more sheet layers of copper laminate laminated onto and/or between sheet layers of nonconductive substrate. The conductive features can be part of the system bus 107 communicatively linking the various components of the electronic controller 101. In some embodiments, the circuit board can be a printed circuit board. In some embodiments, the circuit board can be a motherboard.

General Terminology and Interpretative Conventions

Any methods described in the claims or specification should not be interpreted to require the steps to be performed in a specific order unless expressly stated otherwise or doing so is impossible. Also, the methods should be interpreted to provide support to perform the recited steps in any order unless expressly stated otherwise.

Certain features described in the context of separate embodiments can also be implemented in combination in a single embodiment. Conversely, various features described in the context of a single embodiment can also be implemented in multiple embodiments separately or in any suitable subcombination. Moreover, although features may be described in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of," "consisting of the recited subject matter plus impurities and/or trace amounts of other materials," or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, terms such as "processing," "computing," "calculating," "determining," "displaying," or the like, refer to the action and processes of an electronic controller including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Quickly releasable joining (i.e., quick-release) refers to joining that that can be released without the use of tools. Readily or easily releasable joining refers to joining that can be readily, easily, and/or promptly released with little or no difficulty or effort. Some joining can qualify as both quickly releasable joining and readily or easily releasable joining. Other joining can qualify as one of these types of joining but not the other. For example, one type of joining may be readily or easily releasable but also require the use of a tool.

Non-quickly releasable joining (i.e., non-quick-release) refers to joining that can only be released with the use of tools. Difficult or hard to release joining refers to joining that is difficult, hard, or arduous to release and/or requires substantial effort to release. Some joining can qualify as both non-quickly releasable joining and difficult or hard to release joining. Other joining can qualify as one of these types of joining but not the other. For example, one type of joining may require the use of a tool but may not be difficult or hard to release.

The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners is given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or confirmat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Priority Patent Documents Incorporated by Reference

U.S. Prov. App. No. 63/500,879, titled "Freeze Dryer and Freeze-Drying Process for Materials Having Low Water Content," filed on 8 May 2023.

What is claimed is:

1. A freeze dryer comprising:
   a vacuum chamber including one or more interior walls;
   a vacuum pump pneumatically linked to the vacuum chamber;
   a cooling system configured to cool the one or more interior walls of the vacuum chamber;
   a heating system configured to heat material in the vacuum chamber; and
   an electronic controller comprising:
      a processor; and
      memory communicatively linked to the processor, the memory storing instructions used by the processor to operate the freeze dryer;
   wherein the instructions comprise a drying process including drying the material by reducing pressure in the vacuum chamber below ambient pressure and collecting water vapor from the material as ice on the one or more interior walls of the vacuum chamber; and
   wherein the instructions include an option to repeat the drying process with another material without defrosting the ice on the one or more interior walls of the vacuum chamber.

2. The freeze dryer of claim 1 wherein the electronic controller includes a display device communicatively linked to the processor and the drying process includes displaying the option to repeat the drying process with another material without defrosting the ice on the one or more interior walls of the vacuum chamber.

3. The freeze dryer of claim 1 wherein the drying process includes drying the material by reducing the pressure in the vacuum chamber below ambient pressure without freezing the material before reducing the pressure.

4. The freeze dryer of claim 3 wherein the drying process includes cooling the one or more interior walls of the vacuum chamber before providing a prompt to position the material in the freeze dryer.

5. The freeze dryer of claim 4 wherein the electronic controller includes a display device communicatively linked to the processor, and wherein the prompt includes a message displayed on the display device to position the material in the freeze dryer.

6. The freeze dryer of claim 1 wherein the drying process includes heating the material before reducing the pressure below ambient pressure.

7. The freeze dryer of claim 6 wherein the drying process includes heating the material to at least 100° F. before reducing the pressure in the vacuum chamber below ambient pressure.

8. The freeze dryer of claim 6 wherein the drying process includes heating the material for a set amount of time before reducing the pressure in the vacuum chamber below ambient pressure.

9. The freeze dryer of claim 1 wherein the drying process includes drying the material by reducing the pressure in the vacuum chamber to no more than 5000 mTorr.

10. The freeze dryer of claim 1 wherein the drying process includes drying the material in the vacuum chamber below ambient pressure for a set amount of time.

11. The freeze dryer of claim 1 wherein the drying process includes heating the material to at least 100° F. with the heating system while the pressure in the vacuum chamber is below ambient pressure.

12. The freeze dryer of claim 1 wherein the instructions include a freeze-drying process.

13. A freeze dryer comprising:
a vacuum chamber including one or more interior walls;
a vacuum pump pneumatically linked to the vacuum chamber;
a cooling system configured to cool the one or more interior walls of the vacuum chamber;
a heating system configured to heat material in the vacuum chamber; and
an electronic controller comprising:
a processor;
memory communicatively linked to the processor; and
a display device communicatively linked to the processor;
wherein the electronic controller is configured to:
dry the material by reducing pressure in the vacuum chamber below ambient pressure, wherein water vapor removed from the material collects as ice on the one or more interior walls of the vacuum chamber;
display an option on the display device to repeat the drying process with another material without defrosting the ice on the one or more interior walls of the vacuum chamber.

14. The freeze dryer of claim 13 wherein the electronic controller is configured to dry the material by reducing the pressure in the vacuum chamber below ambient pressure without freezing the material before reducing the pressure.

15. The freeze dryer of claim 13 wherein the electronic controller is configured to cool the one or more interior walls of the vacuum chamber before providing a prompt to position the material in the freeze dryer.

16. The freeze dryer of claim 15 wherein the prompt includes a message displayed on the display device to position the material in the freeze dryer.

17. The freeze dryer of claim 13 wherein the electronic controller is configured to heat the material before reducing the pressure below ambient pressure.

18. The freeze dryer of claim 17 wherein the electronic controller is configured to heat the material to at least 100° F. before reducing the pressure in the vacuum chamber below ambient pressure.

19. The freeze dryer of claim 17 wherein the electronic controller is configured to heat the material for a set amount of time before reducing the pressure in the vacuum chamber below ambient pressure.

20. A method for drying a first material and a second material in a freeze dryer, the freeze dryer comprising:
a vacuum chamber including one or more interior walls;
a vacuum pump pneumatically linked to the vacuum chamber;
a cooling system configured to cool the one or more interior walls of the vacuum chamber;
a heating system configured to heat the first material and the second material in the vacuum chamber; and
an electronic controller comprising:
a processor; and
memory communicatively linked to the processor;
the method comprising:
positioning the first material in the freeze dryer;
drying the first material by reducing the pressure in the vacuum chamber below ambient pressure;
collecting water vapor from the first material as ice on the one or more interior walls of the vacuum chamber;
removing the first material in the freeze dryer;
positioning the second material in the freeze dryer;
drying the second material in the freeze dryer by reducing pressure in the vacuum chamber below ambient pressure without defrosting the ice on the one or more interior walls of the vacuum chamber.

21. The method of claim 20 wherein the electronic controller comprises a display device communicatively linked to the processor and the method comprises displaying an option on the display device to dry the second material without defrosting the ice on the one or more interior walls of the vacuum chamber.

22. The method of claim 20 wherein the first material includes no more than 20 wt % water.

23. The method of claim 20 wherein the first material includes no more than 15 wt % water.

24. The method of claim 20 wherein the first material includes at least 20 wt % sugar.

25. The method of claim 20 wherein the method includes drying the first material by reducing the pressure in the vacuum chamber below ambient pressure without freezing the first material before reducing the pressure.

26. The method of claim 25 wherein the method includes cooling the one or more interior walls of the vacuum chamber before providing a prompt to position the first material in the freeze dryer.

27. The method of claim 26 wherein the electronic controller includes a display device communicatively linked to the processor, the method comprising displaying a message on the display device to position the first material in the freeze dryer.

28. The method of claim 20 comprising heating the first material before reducing the pressure below ambient pressure.

29. The method of claim 28 comprising heating the first material to at least 100° F. before reducing the pressure in the vacuum chamber below ambient pressure.

30. The method of claim 28 comprising heating the first material for a set amount of time before reducing the pressure in the vacuum chamber below ambient pressure.

* * * * *